United States Patent
Siris et al.

(10) Patent No.: US 10,191,918 B1
(45) Date of Patent: Jan. 29, 2019

(54) CONCEPTS FOR ENHANCED LOCATION INFORMATION

(71) Applicant: UNITED PARCEL SERVICE OF AMERICA, INC., Atlanta, GA (US)

(72) Inventors: Marc David Siris, Atlanta, GA (US); Christopher T. Schenken, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 141 days.

(21) Appl. No.: 14/180,794

(22) Filed: Feb. 14, 2014

Related U.S. Application Data

(60) Provisional application No. 61/765,416, filed on Feb. 15, 2013.

(51) Int. Cl.
G06F 17/30 (2006.01)
G01C 21/00 (2006.01)
G01C 21/36 (2006.01)

(52) U.S. Cl.
CPC .. *G06F 17/30241* (2013.01); *G06F 17/30864* (2013.01); *G01C 21/005* (2013.01); *G01C 21/3679* (2013.01); *G01C 21/3682* (2013.01); *G06F 17/30061* (2013.01); *G06F 17/30321* (2013.01); *G06F 17/30554* (2013.01)

(58) Field of Classification Search
CPC .. G01C 21/3679; G01C 21/20; G01C 21/005; G01C 21/26; G01C 21/32; G01C 21/3682; G01C 21/3438; G06F 17/3087; G06F 17/30241; G06F 17/30864; G06F 17/30061; G06F 17/30321; G06F 17/30554; G06F 17/30696

USPC .............. 707/724, 710, 723, 737, 769, 918; 701/426, 438

See application file for complete search history.

(56) References Cited

U.S. PATENT DOCUMENTS

| | | | |
|---|---|---|---|
| 6,363,320 B1 | 3/2002 | Chou | |
| 6,898,516 B2 * | 5/2005 | Pechatnikov | G01C 21/26 701/411 |
| 7,225,983 B2 | 6/2007 | Park et al. | |
| 8,065,076 B2 | 11/2011 | Graham et al. | |
| 8,140,551 B2 | 3/2012 | Garner et al. | |
| 8,280,628 B2 | 10/2012 | Smith | |
| 8,458,173 B2 * | 6/2013 | Laurenzo | G01C 21/32 707/723 |

(Continued)

OTHER PUBLICATIONS

U.S. Appl. No. 14/180,755, "Geographic Representations of Geographic Areas", Unpublished (filed Feb. 14, 2014), (Marc David Siris, Inventor) (United Parcel Service of America, Inc., assignee).

(Continued)

*Primary Examiner* — Dangelino N Gortayo
(74) *Attorney, Agent, or Firm* — Shook, Hardy and Bacon LLP

(57) ABSTRACT

Computer program products, methods, systems, apparatus, and computing entities are provided for standardizing addresses and providing information associated with geographic areas/points of interest. For example, location data can be collected for serviceable points. From the collected location data, addresses can be standardized, location-based searches can be performed, correct locations of serviceable points can be confirmed, and geographic representations can be generated.

21 Claims, 19 Drawing Sheets

(56) References Cited

U.S. PATENT DOCUMENTS

| | | | |
|---|---|---|---|
| 8,538,679 B1 | 9/2013 | Takyar et al. | |
| 8,589,069 B1* | 11/2013 | Lehman | G01C 21/20 340/995.1 |
| 8,645,366 B1* | 2/2014 | Acharya | G06F 17/3087 707/723 |
| 8,649,967 B1 | 2/2014 | Daniel | |
| 8,666,654 B2* | 3/2014 | Vandivier | G01C 21/3682 701/411 |
| 8,682,898 B2 | 3/2014 | Joshi et al. | |
| 8,725,288 B2 | 5/2014 | Yeung et al. | |
| 8,725,706 B2* | 5/2014 | Arrasvuori | G06F 3/04812 707/700 |
| 8,736,442 B2 | 5/2014 | Zazula | |
| 8,798,903 B2* | 8/2014 | Feng | G01C 21/3679 701/400 |
| 8,810,437 B2* | 8/2014 | Beyeler | G01C 21/3682 340/995.1 |
| 8,898,173 B1* | 11/2014 | Badoiu | G06F 17/3087 707/748 |
| 9,057,617 B1* | 6/2015 | Lopatenko | G08G 1/0962 |
| 9,060,245 B2* | 6/2015 | Baker | G06Q 20/102 |
| 9,070,100 B2 | 6/2015 | Davidson | |
| 9,083,789 B2 | 7/2015 | Dicke et al. | |
| 9,152,726 B2* | 10/2015 | Lymperopoulos | G06F 17/3087 |
| 2002/0104026 A1 | 8/2002 | Barra et al. | |
| 2004/0022422 A1 | 2/2004 | Yamauchi et al. | |
| 2005/0187836 A1 | 8/2005 | Wolfe | |
| 2006/0220922 A1 | 10/2006 | Brinton et al. | |
| 2006/0276204 A1 | 12/2006 | Simpson et al. | |
| 2008/0234931 A1* | 9/2008 | Wang | G09B 29/007 701/533 |
| 2009/0216732 A1* | 8/2009 | Feng | G01C 21/3611 707/999.004 |
| 2009/0234570 A1 | 9/2009 | Sever | |
| 2011/0068954 A1 | 3/2011 | McQuade et al. | |
| 2011/0112761 A1 | 5/2011 | Hurley et al. | |
| 2012/0054232 A1 | 3/2012 | Ross et al. | |
| 2012/0253861 A1 | 10/2012 | Davidson et al. | |
| 2012/0295639 A1* | 11/2012 | Fitoussi | H04W 4/043 455/456.3 |
| 2012/0313777 A1 | 12/2012 | Zazula | |
| 2013/0257900 A1* | 10/2013 | Brahmakal | G01C 21/3679 345/619 |
| 2013/0339387 A1* | 12/2013 | Duong | G06F 17/3087 707/770 |
| 2014/0164280 A1 | 6/2014 | Stepanenko | |
| 2014/0214791 A1* | 7/2014 | Singh | G06F 17/3087 707/710 |
| 2015/0169627 A1 | 6/2015 | Gildfind et al. | |
| 2015/0172861 A1* | 6/2015 | Byun | H04W 4/021 455/456.3 |

OTHER PUBLICATIONS

U.S. Appl. No. 14/180,776, "Standardization of Addresses and Location Information", Unpublished (filed Feb. 14, 2014), (Marc David Siris, Inventor) (United Parcel Service of America, Inc., assignee).

United States Patent and Trademark Office, Office Action for U.S. Appl. No. 14/180,755, filed Nov. 18, 2015, 15 pages, U.S.A.

United States Patent and Trademark Office, Office Action for U.S. Appl. No. 14/180,776, filed Dec. 21, 2015, 22 pages, U.S.A.

United States Patent and Trademark Office, Office Action for U.S. Appl. No. 14/180,755, dated Apr. 8, 2016, 15 pages, U.S.A.

United States Patent and Trademark Office, Office Action for U.S. Appl. No. 14/180,776, dated Jun. 13, 2016, 32 pages, U.S.A.

United States Patent and Trademark Office, Office Action for U.S. Appl. No. 14/180,755, dated Aug. 8, 2016, 11 pages, U.S.

United States Patent and Trademark Office, Office Action for U.S. Appl. No. 14/180,755, dated Nov. 29, 2016, 13 pages, U.S.A.

United States Patent and Trademark Office, Office Action for U.S. Appl. No. 14/180,776, dated Jan. 31, 2017, 20 pages, U.S.A.

Notice of Allowance and Fees Due (PTOL-85) dated Aug. 2, 2017 for U.S. Appl. No. 14/180,776.

Non-Final Rejection dated Jun. 15, 2017 for U.S. Appl. No. 14/180,755.

Notice of Allowance and Fees Due (PTOL-85) dated Jan. 4, 2018 for U.S. Appl. No. 14/180,755.

\* cited by examiner

| A | B | C | D | E | F | G | H | I | J | K | L | M | N |
|---|---|---|---|---|---|---|---|---|---|---|---|---|---|
| Key1 | Key2 | CollectedGeocode | LastName | FirstName | StreetNum | StreetName | SuiteNum | BuildingFloorNum | ZipCode | City | County | State | Country |
| 1 | | 33.7869128, -84.3875602 | Jones | A. Richard | 1203 | West Peachtree Street, Northwest | | | 30309 | Atlanta | Fulton | Georgia | United States |

Fig. 6

| | A | B | C | D | E | F | G | H | I | J | K | L | M | N |
|---|---|---|---|---|---|---|---|---|---|---|---|---|---|---|
| 1 | Key1 | Key2_CollectedGeocode | | LastName | FirstName | StreetNum | StreetName | SuiteNum | BuildingFloorNum | ZipCode | City | County | State | Country |
| 2 | 1 | 33.7869128, -84.3875602 | | Jones | A. Richard | 1201 | West Peachtree Street, Northwest | | | 30309 | Atlanta | Fulton | Georgia | United States |
| 3 | 2 | 33.7869124, -84.3875610 | | Jones | Richard | 1201 | W Peachtree Street | | | 30309 | Atlanta | Fulton | Georgia | United States |
| 4 | 3 | 33.7869121, -84.3875605 | | Jones | Rich | 1201 | West Peachtree St. | | | 30309 | Atlanta | Fulton | Georgia | United States |
| 5 | 4 | 33.7869123, -84.3875611 | | Jones | Kyle | 1201 | W. Peachtree St. | | | 30309 | Atlanta | Fulton | Georgia | United States |
| 6 | 5 | 33.7869125, -84.3875613 | | Jones | Rich | 1201 | West Peachtree Street | | | 30309 | Atlanta | Fulton | Georgia | United States |
| 7 | 6 | 33.7869128, -84.3875601 | | Jones | Rich | 1201 | W Peachtree Street, NW | | | 30309 | Atlanta | Fulton | Georgia | United States |
| 8 | 7 | 33.7869131, -84.3875603 | | Jones | Beverly | 1201 | W Peachtree St. NW | | | 30309 | Atlanta | Fulton | Georgia | United States |
| 9 | 8 | 33.7869130, -84.3875609 | | Jones | Janice | 1201 | West Peachtree St. | | | 30309 | Atlanta | Fulton | Georgia | United States |
| 10 | 9 | 33.7869126, -84.3875607 | | Jones | Janice | 1201 | W. Peachtree St. | | | 30309 | Atlanta | Fulton | Georgia | United States |

Fig. 7

| | A | B | C | D | E | F | G | H | I | J | K | L | M | N |
|---|---|---|---|---|---|---|---|---|---|---|---|---|---|---|
| | Key1 ReferenceGeocode | Key2 ReferenceGeocode | Key3 CollectedGeocode | LastName | FirstName | StreetNum | StreetName | SuiteNum | BuildingFloorNum | ZipCode | City | County | State | Country |
| 1 | 33.7869126, -84.3875606 | 33.7869128, -84.3875602 | Jones | A. Richard | 1201 | West Peachtree Street, Northwest | | | | | | | |
| 2 | 33.7869126, -84.3875606 | 33.7869124, -84.3875610 | Jones | Richard | 1201 | W Peachtree Street | | | 30309 | Atlanta | Fulton | Georgia | United States |
| 3 | 33.7869126, -84.3875606 | 33.7869121, -84.3875605 | Jones | Rich | 1201 | West Peachtree St. | | | 30309 | Atlanta | Fulton | Georgia | United States |
| 4 | 33.7869126, -84.3875606 | 33.7869123, -84.3875611 | Jones | Kyle | 1201 | W. Peachtree St. | | | 30309 | Atlanta | Fulton | Georgia | United States |
| 5 | 33.7869126, -84.3875606 | 33.7869125, -84.3875613 | Jones | Rich | 1201 | West Peachtree Street | | | 30309 | Atlanta | Fulton | Georgia | United States |
| 6 | 33.7869126, -84.3875606 | 33.7869128, -84.3875601 | Jones | Rich | 1201 | W Peachtree Street, NW | | | 30309 | Atlanta | Fulton | Georgia | United States |
| 7 | 33.7869126, -84.3875606 | 33.7869134, -84.3875603 | Jones | Beverly | 1201 | W Peachtree St, NW | | | 30309 | Atlanta | Fulton | Georgia | United States |
| 8 | 33.7869126, -84.3875606 | 33.7869130, -84.3875609 | Jones | Janice | 1201 | West Peachtree St. | | | 30309 | Atlanta | Fulton | Georgia | United States |
| 9 | 33.7869126, -84.3875606 | 33.7869126, -84.3875607 | Jones | Janice | 1201 | W. Peachtree St. | | | 30309 | Atlanta | Fulton | Georgia | United States |

Fig. 8A

| | A | B | C | D | E | F | G | H | I | J | K | L | M | N |
|---|---|---|---|---|---|---|---|---|---|---|---|---|---|---|
| | Key1 ReferenceGeocode | Key2 ReferenceGeocode | Key3 CollectedGeocode | LastName | FirstName | StreetNum | StreetName | SuiteNum | BuildingFloorNum | ZipCode | City | County | State | Country |
| 1 | 33.7869128, -84.3875602 | | | Jones | A. Richard | 1201 | West Peachtree Street, Northwest | | | 30309 | Atlanta | Fulton | Georgia | United States |
| 2 | 33.7869128, -84.3875602 | | 33.7869124, -84.3875610 | Jones | Richard | 1201 | W Peachtree Street | | | 30309 | Atlanta | Fulton | Georgia | United States |
| 3 | 33.7869128, -84.3875602 | | 33.7869121, -84.3875605 | Jones | Rich | 1201 | West Peachtree St. | | | 30309 | Atlanta | Fulton | Georgia | United States |
| 4 | 33.7869128, -84.3875602 | | 33.7869123, -84.3875611 | Jones | Kyle | 1201 | W. Peachtree St. | | | 30309 | Atlanta | Fulton | Georgia | United States |
| 5 | 33.7869128, -84.3875602 | | 33.7869125, -84.3875613 | Jones | Rich | 1201 | West Peachtree Street | | | 30309 | Atlanta | Fulton | Georgia | United States |
| 6 | 33.7869128, -84.3875602 | | 33.7869128, -84.3875601 | Jones | Rich | 1201 | W Peachtree Street, NW | | | 30309 | Atlanta | Fulton | Georgia | United States |
| 7 | 33.7869128, -84.3875602 | | 33.7869131, -84.3875603 | Jones | Beverly | 1201 | W Peachtree St, NW | | | 30309 | Atlanta | Fulton | Georgia | United States |
| 8 | 33.7869128, -84.3875602 | | 33.7869130, -84.3875609 | Jones | Janice | 1201 | West Peachtree St. | | | 30309 | Atlanta | Fulton | Georgia | United States |
| 9 | 33.7869128, -84.3875602 | | 33.7869126, -84.3875607 | Jones | Janice | 1201 | W. Peachtree St. | | | 30309 | Atlanta | Fulton | Georgia | United States |

Fig. 8B

CONCEPTS FOR ENHANCED LOCATION INFORMATION

CROSS-REFERENCE TO RELATED APPLICATIONS

This application claims priority to U.S. Application No. 61/765,416 filed Feb. 15, 2013, which is hereby incorporated herein in its entirety by reference.

BACKGROUND

With the explosion of mobile devices, a variety of needs exist related to digital maps. For example, a need exists for ways to standardize address, provide location-based services, confirmation the location of points of interest, and generate geographic representations of geographic areas.

BRIEF SUMMARY

In general, embodiments of the present invention provide methods, apparatus, systems, computing devices, computing entities, and/or the like.

In accordance with one aspect, a method is provided. In one embodiment, the method comprises (1) identifying a plurality of records corresponding to a serviceable point, wherein each of the plurality of records comprises location data collected from a visit to the serviceable point; (2) determining reference location data for the serviceable point based at least in part on the location data from each of the plurality of records; and (3) assigning the reference location data to each of the plurality of records corresponding to the serviceable point.

In accordance with another aspect, a computer program product is provided. The computer program product may comprise at least one computer-readable storage medium having computer-readable program code portions stored therein, the computer-readable program code portions comprising executable portions configured to (1) identify a plurality of records corresponding to a serviceable point, wherein each of the plurality of records comprises location data collected from a visit to the serviceable point; (2) determine reference location data for the serviceable point based at least in part on the location data from each of the plurality of records; and (3) assign the reference location data to each of the plurality of records corresponding to the serviceable point.

In accordance with yet another aspect, an apparatus comprising at least one processor and at least one memory including computer program code is provided. In one embodiment, the at least one memory and the computer program code may be configured to, with the processor, cause the apparatus to (1) identify a plurality of records corresponding to a serviceable point, wherein each of the plurality of records comprises location data collected from a visit to the serviceable point; (2) determine reference location data for the serviceable point based at least in part on the location data from each of the plurality of records; and (3) assign the reference location data to each of the plurality of records corresponding to the serviceable point.

In accordance with one aspect, a method is provided. In one embodiment, the method comprises (1) identifying a plurality of records corresponding to a geographic area, wherein each of the plurality of records comprises location data associated with the geographic area, the location data collected from one or more visits to the geographic area; (2) generating a geographic representation of the geographic area based at least in part on the location data from the plurality of records; and (3) causing display of the geographic representation of the geographic representation of the geographic area.

In accordance with another aspect, a computer program product is provided. The computer program product may comprise at least one computer-readable storage medium having computer-readable program code portions stored therein, the computer-readable program code portions comprising executable portions configured to (1) identify a plurality of records corresponding to a geographic area, wherein each of the plurality of records comprises location data associated with the geographic area, the location data collected from one or more visits to the geographic area; (2) generate a geographic representation of the geographic area based at least in part on the location data from the plurality of records; and (3) cause display of the geographic representation of the geographic representation of the geographic area.

In accordance with yet another aspect, an apparatus comprising at least one processor and at least one memory including computer program code is provided. In one embodiment, the at least one memory and the computer program code may be configured to, with the processor, cause the apparatus to (1) identify a plurality of records corresponding to a geographic area, wherein each of the plurality of records comprises location data associated with the geographic area, the location data collected from one or more visits to the geographic area; (2) generate a geographic representation of the geographic area based at least in part on the location data from the plurality of records; and (3) cause display of the geographic representation of the geographic representation of the geographic area.

In accordance with one aspect, a method is provided. In one embodiment, the method comprises (1) receiving input identifying a geographic area and search criteria; (2) providing the search criteria for a search to be performed based on the geographic area and the search criteria; (3) receiving and causing display of the results of the search to a mobile device, wherein the results comprise information about a point of interest; and (4) after providing the results of the search to the mobile device, monitoring the location of the mobile device to determine when the mobile device is proximate the point of interest.

In accordance with another aspect, a computer program product is provided. The computer program product may comprise at least one computer-readable storage medium having computer-readable program code portions stored therein, the computer-readable program code portions comprising executable portions configured to (1) receive input identifying a geographic area and search criteria; (2) provide the search criteria for a search to be performed based on the geographic area and the search criteria; (3) receive and cause display of the results of the search to a mobile device, wherein the results comprise information about a point of interest; and (4) after providing the results of the search to the mobile device, monitor the location of the mobile device to determine when the mobile device is proximate the point of interest.

In accordance with yet another aspect, an apparatus comprising at least one processor and at least one memory including computer program code is provided. In one embodiment, the at least one memory and the computer program code may be configured to, with the processor, cause the apparatus to (1) receive input identifying a geographic area and search criteria; (2) provide the search criteria for a search to be performed based on the geographic area and the search criteria; (3) receive and cause display of the results of the search to a mobile device, wherein the results comprise information about a point of interest; and (4) after providing the results of the search to the mobile device, monitor the location of the mobile device to determine when the mobile device is proximate the point of interest.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
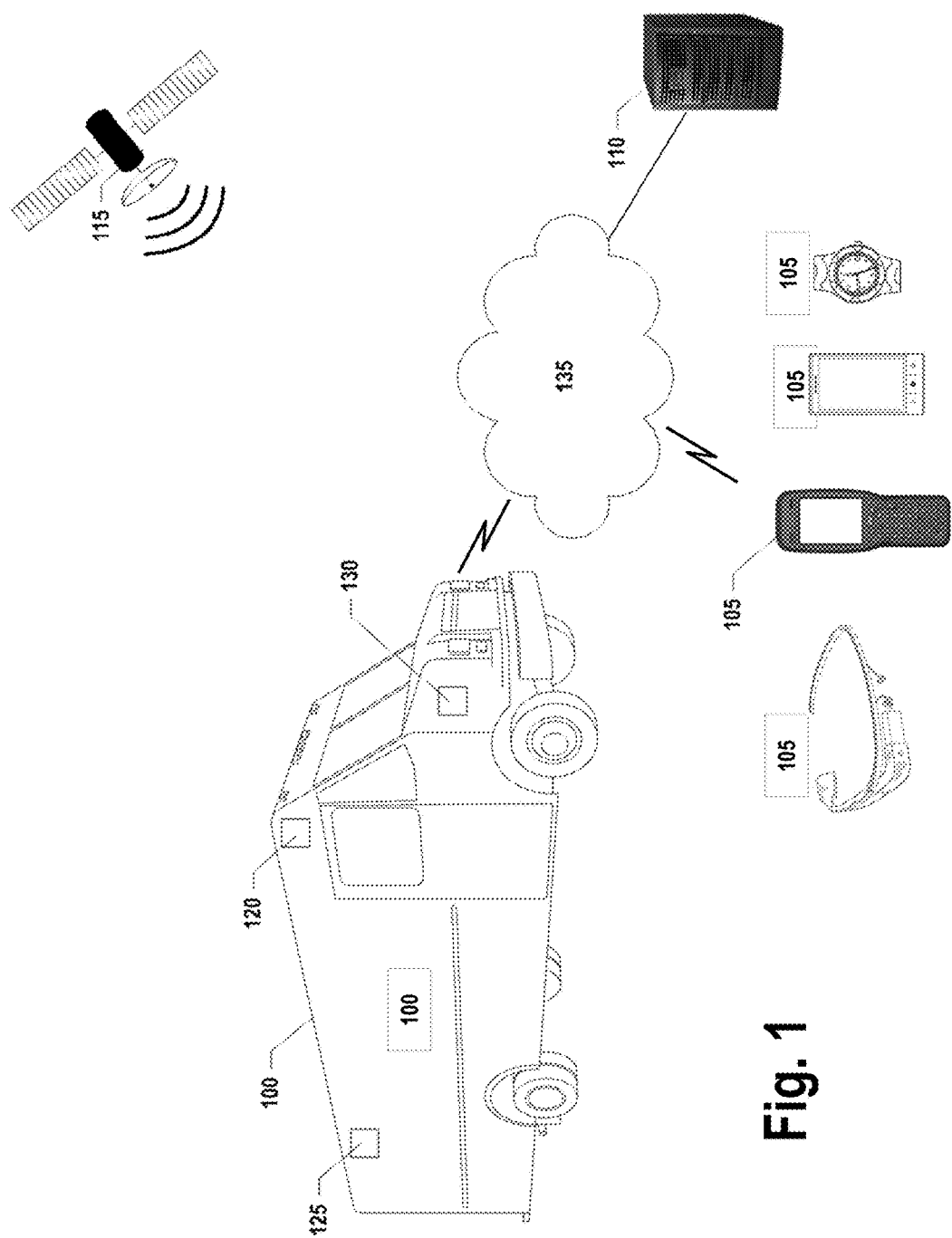
FIG. 1 is a diagram of a system that can be used to practice various embodiments of the present invention.

FIGS. 6-7, 8A, 8B, 9-14, 15A, 15B, 15C, and 16-19 illustrate exemplary input and output in accordance with various embodiments of the present invention.

DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a system that can be used in conjunction with various embodiments of the present invention. As shown in FIG. 1, the system may include one or more vehicles 100, one or more mobile devices 105, one or more mapping computing entities 110, one or more Global Positioning System (GPS) satellites 115, one or more location sensors 120, one or more telematics sensors 125, one or more data collection devices 130, one or more networks 135, one or more user devices 140 (not shown), and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

a. Exemplary Vehicle

In various embodiments, the term vehicle 100 is used generically. For example, a vehicle 100 may be a tractor, a truck, a car, a motorcycle, a moped, a Segway, a bicycle, a golf cart, a hand truck, a cart, a trailer, a tractor and trailer combination, a van, a flatbed truck, a vehicle, drone, airplane, helicopter, and/or any other form of object for moving or transporting people and/or items (e.g., one or more packages, parcels, bags, containers, loads, crates, items banded together, vehicle parts, pallets, drums, the like, and/or similar words used herein interchangeably). Although in certain embodiments, the vehicle may be unmanned. In one embodiment, each vehicle 100 may be associated with a unique vehicle identifier (such as a vehicle ID) that uniquely identifies the vehicle 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information assigned to the vehicle 100.

Figure 2:
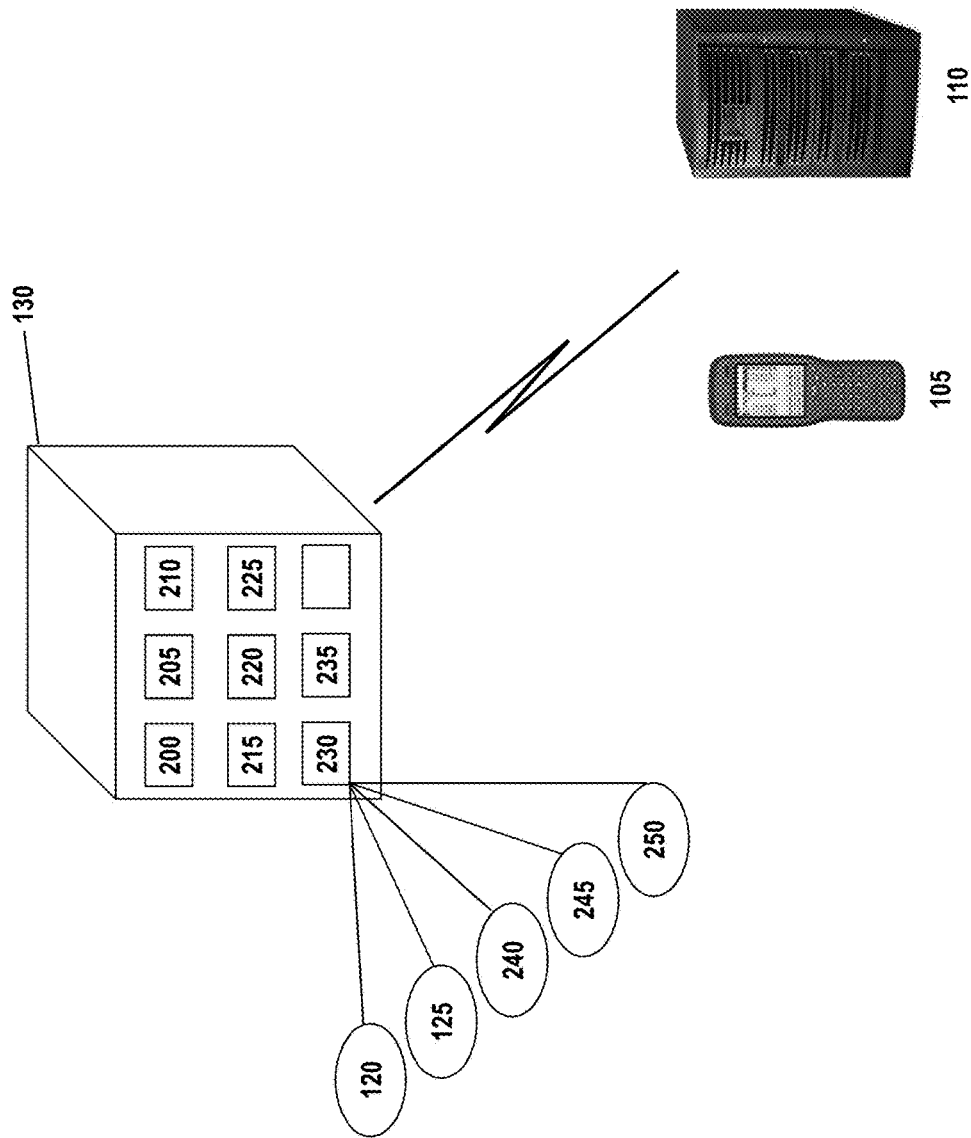
FIG. 2 is a diagram of a data collection device that may be used in association with certain embodiments of the present invention.

FIG. 1 shows one or more computing entities, devices, and/or similar words used herein interchangeably that are associated with the vehicle 100, such as a data collection device 130 or other computing entities. In general, the terms computing entity, entity, device, system, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, televisions, dongles, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary data collection device 130 that may be attached, affixed, disposed upon, integrated into, or part of a vehicle 100. The data collection device 130 may collect telematics data (including location data) and transmit/send the data to the mobile device 105, the mapping computing entity 110, and/or various other computing entities via one of several communication methods.

In one embodiment, the data collection device 130 may include, be associated with, or be in communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics data from various sensors (e.g., via a CAN-bus), one or more communication ports 205 for transmitting/sending data, one or more RFID tags/sensors 250, one or more power sources 220, one or more data radios 235 for communication with a variety of communication networks, one or more memory modules 210, and one or more programmable logic controllers (PLC) 225. It should be noted that many of these components may be located in the vehicle 100 but external to the data collection device 130.

In one embodiment, the one or more location sensors 120, modules, or similar words used herein interchangeably may be one of several components in communication with or available to the data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, heading or direction, geocode, course, position, time, and/or speed data (e.g., referred to herein as telematics data and further described herein below). The one or more location sensors 120 may also communicate with the mapping computing entity 110, the data collection device 130, mobile device 105, and/or similar computing entities.

As indicated, in addition to the one or more location sensors 120, the data collection device 130 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, and speed sensors. The telematics data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics data may also include carbon monoxide (CO), nitrogen oxides (NOx), sulfur oxides (SOx), ozone ($O_3$), hydrogen sulfide ($H_2S$) and/or ammonium ($NH_4$) data, and/or meteorological data (e.g., referred to herein as telematics data).

In one embodiment, the ECM 245 may be one of several components in communication with and/or available to the data collection device 130. The ECM 245, which may be a scalable and subservient device to the data collection device 130, may have data processing capability to decode and store analog and digital inputs from vehicle systems and sensors. The ECM 245 may further have data processing capability to collect and present telematics data to the J-Bus (which may allow transmission to the data collection device 130), and output standard vehicle diagnostic codes when received from a vehicle's J-Bus-compatible on-board controllers 240 and/or sensors.

As indicated, a communication port 230 may be one of several components available in the data collection device 130 (or be in or as a separate computing entity). Embodiments of the communication port 230 may include an Infrared data Association (IrDA) communication port, a data radio, and/or a serial port. The communication port 230 may receive instructions for the data collection device 130. These instructions may be specific to the vehicle 100 in which the data collection device 130 is installed, specific to the geographic area in which the vehicle 100 will be traveling, specific to the function the vehicle 100 serves within a fleet, and/or the like. In one embodiment, the data radio 235 may be configured to communicate with a wireless wide area network (WWAN), wireless local area network (WLAN), wireless personal area network (WPAN), or any combination thereof. For example, the data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

b. Exemplary Mapping Computing Entity

Figure 3:
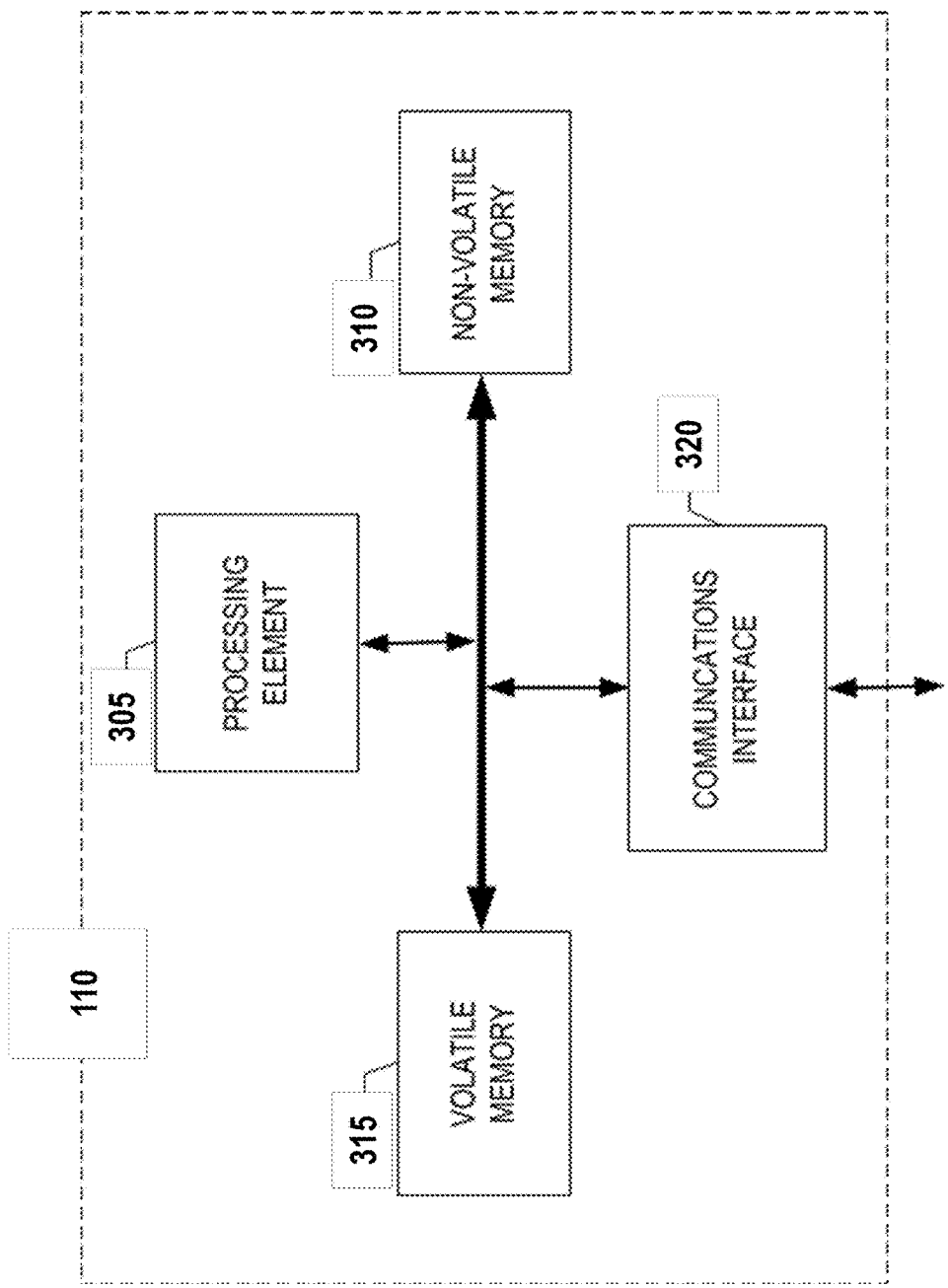
FIG. 3 is a schematic of a mapping computing entity in accordance with certain embodiments of the present invention.

FIG. 3 provides a schematic of a mapping computing entity 110 according to one embodiment of the present invention. In general, the terms computing entity, entity, device, system, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, glasses, televisions, dongles, key fobs, RFID tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the mapping computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the mapping computing entity 110 may communicate with vehicles 100, mobile devices 105, and/or the like.

As shown in FIG. 3, in one embodiment, the mapping computing entity 110 may include or be in communication with one or more processing elements 305 (also referred to as processors, processing circuitry, and/or similar terms used herein interchangeably) that communicate with other elements within the mapping computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the mapping computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or data that is stored in a computer-readable storage medium, such as via a relational database, hierarchical database, and/or network database.

In one embodiment, the mapping computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the mapping computing entity 110 with the assistance of the processing element 305 and operating system.

As indicated, in one embodiment, the mapping computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the mapping computing entity 110 may communicate with computing entities or communication interfaces of the vehicle 100, mobile devices 105, and/or the like.

Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the mapping computing entity 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the mapping computing entity 110 may include or be in communication with one or more input elements, such as a keyboard input, a mouse input, a touch screen/display input, audio input, pointing device input, joystick input, keypad input, and/or the like. The mapping computing entity 110 may also include or be in communication with one or more output elements (not shown), such as audio output, video output, screen/display output, motion output, movement output, and/or the like.

As will be appreciated, one or more of the mapping computing entity's 110 components may be located remotely from other mapping computing entity 110 components, such as in a distributed system. Furthermore, one or more of the components may be combined and additional components performing functions described herein may be included in the mapping computing entity 110. Thus, the mapping computing entity 110 can be adapted to accommodate a variety of needs and circumstances.

c. Exemplary Mobile Device

Figure 4:
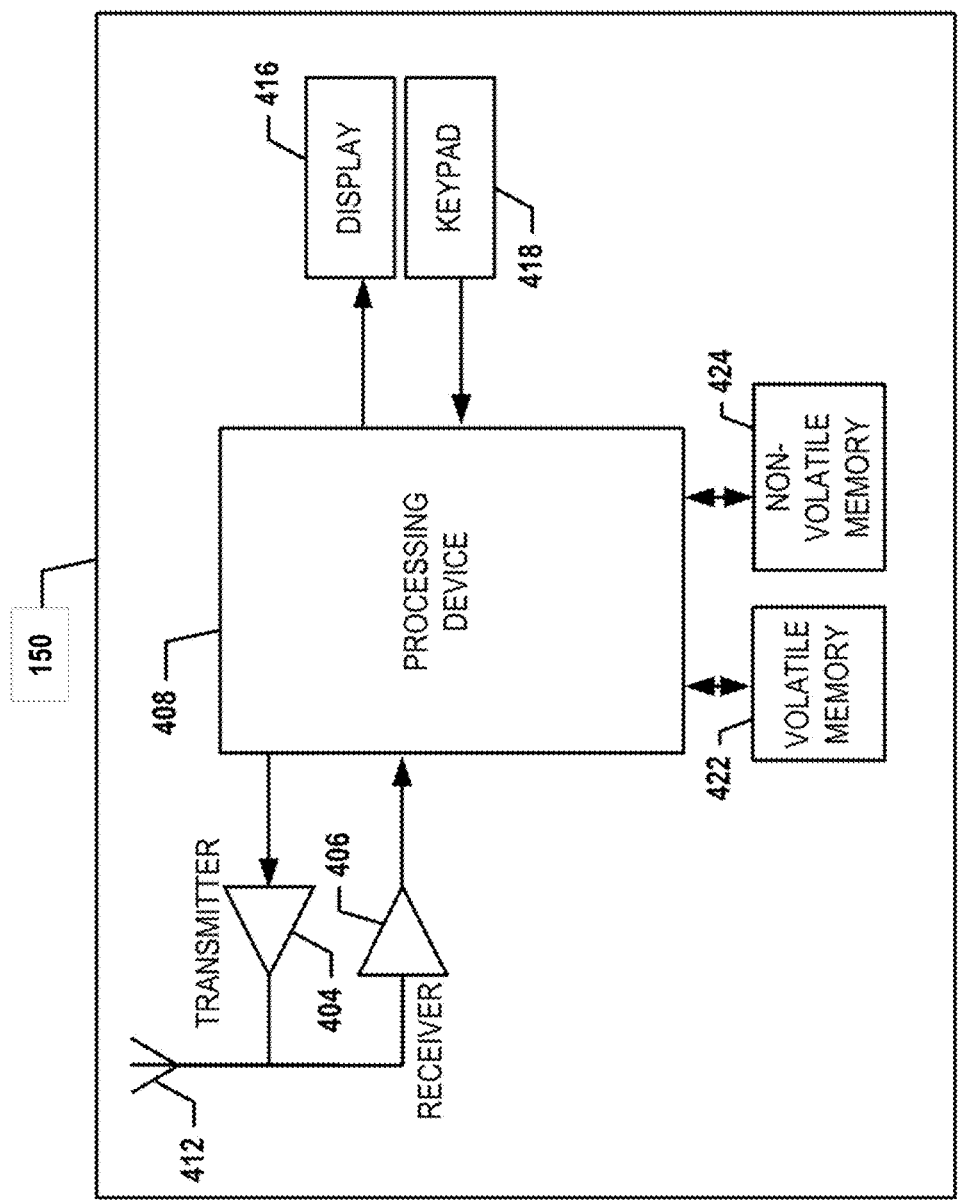
FIG. 4 is a schematic of a mobile device in accordance with certain embodiments of the present invention.

FIG. 4 provides an illustrative schematic representative of a mobile device 105 that can be used in conjunction with embodiments of the present invention. In one embodiment, the mobile devices 105 may include one or more components that are functionally similar to those of the mapping computing entity 110 and/or as described below. As will be recognized, mobile devices 105 can be operated by various parties, including operators of vehicles 100. As shown in FIG. 4, a mobile device 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling data in accordance with an air interface standard of applicable wireless systems to communicate with various entities, such as vehicles 100, mapping computing entities 110, and/or the like. In this regard, the mobile device 105 may be capable of operating with one or more air interface standards, communication protocols, modulation types, and access types. More particularly, the mobile device 105 may operate in accordance with any of a number of wireless communication standards and protocols. In a particular embodiment, the mobile device 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile device 105 can also download changes, add-ons, and updates, for instance, to its firmware, software (e.g., including executable instructions, applications, program modules), and operating system.

According to one embodiment, the mobile device 105 may include location determining aspects, devices, modules, functionalities, and/or similar words used herein interchangeably. For example, the mobile device 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information may be determined by triangulating the mobile device's 105 position in connection with a variety of other systems, including cellular towers, Wi-Fi access points, and/or the like. Similarly, the mobile device 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The mobile device 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile device 105 to interact with and/or cause display of information. The user input interface can comprise any of a number of devices allowing the mobile device 105 to receive data, such as a keypad 418 (hard or soft), a touch display, voice or motion interfaces, scanners, readers, or other input device. In embodiments including a keypad 418, the keypad 418 can include (or cause display of) the conventional numeric (0-9) and related keys (#, *), and other keys used for operating the mobile device 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile device can collect contextual data as part of the telematics data.

The mobile device 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile device 105.

d. Exemplary User Computing Entity

In one embodiment, the user computing entities 140 may each include one or more components that are functionally similar to those of the mapping computing entity 110 and/or the mobile device 105. For example, in one embodiment, each of the user computing entities 140 may include: (1) a processing element that communicates with other elements via a system interface or bus; (2) a user interface; (3) transitory and non-transitory memory; and (4) a communications interface. As previously noted, the user computing entity 140 may comprise a user interface. For example, the user interface may be an application, browser, user interface, dashboard, webpage, and/or similar words used herein interchangeably executing on and/or accessible via the user computing entity 140 to interact with and/or cause display of information from the mapping computing entity 110 and/or the mobile device 105, as described herein. These architectures are provided for exemplary purposes only and are not limiting to the various embodiments.

III. Exemplary System Operation

Figure 5:
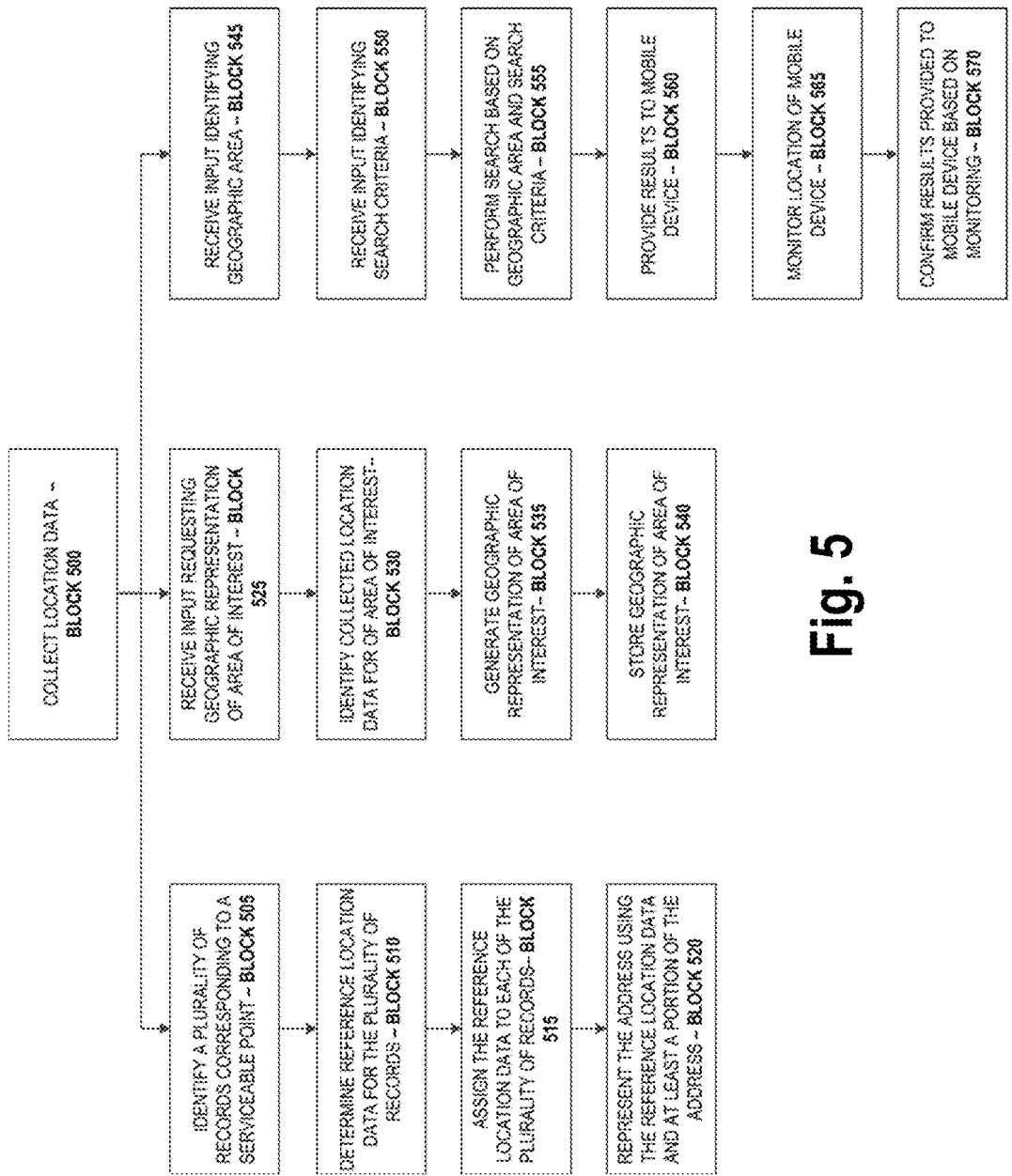
FIG. 5 is a flowchart illustrating operations and processes that can be used in accordance with various embodiments of the present invention.

Reference will now be made to FIGS. 5-7, 8A, 8B, 9-14, 15A, 15B, 15C, and 16-19. FIG. 5 is a flowchart illustrating operations and processes that can be used in accordance with various embodiments of the present invention. FIGS. 6-7, 8A, 8B, 9-14, 15A, 15B, 15C, and 16-19 illustrate exemplary input and output in accordance with various embodiments of the present invention.

a. Exemplary Map Information

In one embodiment, a "serviceable point" may be any identifiable location, such as one or more addresses, one or more delivery locations, one or more pickup locations, one or more parking locations, one or more sidewalks, one or more highways, one or more trails, one or more alleys, one or more paths, one or more walkways, one or more streets, one or more street segments, one or more entrance or exit ramps, one or more roads, one or more longitude and latitude points, one or more geocodes, one or more zip codes, one or more area codes, one or more cities, one or more counties, one or more states, one or more provinces, one or more countries, one or more stops (e.g., pick up stops, delivery stops, vehicle visits), one or more geofenced areas, one or more geographic areas, one or more landmarks, one or more buildings, one or more bridges, and/or other identifiable locations. For example, a serviceable point may be a residential location, such as one or more homes, one or more mobile homes, one or more apartments, one or more apartment buildings, one or more condominiums, one or more townhomes, one or more points at such locations, and/or the like. The serviceable point may also be any specific location at a residential location, such as a front door of a residence, a side door of a residence, a garage door of a residence, a porch, driveway, and/or the like. A serviceable point may also be a commercial location, such as one or more stores in a mall, one or more office buildings, one or more office parks, one or more offices of an apartment complex, one or more garages, one or more warehouses, one or more restaurants, one or more stores, one or more suites, one or more retail locations, one or more points at such locations, and/or the like. The serviceable point may also be any specific location at a commercial location, e.g., (e.g., front door of a commercial location, dock of a commercial location, and/or the like). A serviceable point may be one or more streets, one or more street segments, one or more zones, one or more areas, one or more latitude and/or longitude points (e.g., 33.7869128, −84.3875602), one or more geocodes, and/or the like. A serviceable point may be any identifiable location. As will be recognized, a variety of approaches and techniques can be used to adapt to various needs and circumstances.

In certain embodiments, serviceable points can be represented digitally in geographical, digital maps as map information/data. Map data may include boundary, location, and attribute data corresponding to the various serviceable points and/or the like. As will be recognized, the map data can be stored using a variety of formats, layers, and/or the like—including shapefiles, ArcMaps, geodatabases, coverages, imagery, rasters, computer-aided drafting (CAD) files, other storage formats, and/or the like. For instance, the mapping computing entity 110 can appropriately store/record map information/data as a part of a digital map, e.g., as part of a feature layer, raster layer, service layer, geoprocessing layer, basemap layer, and/or the like.

Further, serviceable points can be represented in digital maps as being accessible by one or more street networks or street segments of a street network. A "street network" is collection of street segments that comprise navigable/traversable/travelable roads, streets, highways, paths, trails, walkways, entrance and exit ramps, bridges, sidewalks, alleys, and/or the like that can be used to access serviceable points. Similar to serviceable points, street networks can be represented in digital maps as navigable/traversable/travelable segments or points for traveling to and/or from serviceable points.

As will be recognized, digital maps (e.g., map data) may include various types of information about serviceable points and street networks, such as the longitude of street segments and/or serviceable points, the latitude of street segments and/or serviceable points, the altitude of street segments and/or serviceable points, the speed limits of street segments, direction restrictions for street segments, time penalties for street segments, and/or other information associated with street networks and serviceable points, and/or the like. For example, in one embodiment, a serviceable point may be represented by and/or associated with a longitude and latitude, a geocode, a nearest street segment, an address, and/or the like. Similarly, street segments of street networks may be represented by or associated with a street name, a segment identifier, a connecting node, an address or address range, a series of longitude and latitude coordinates, and/or the like that define the overall shape and location of the street segment. As will be recognized, a variety of other approaches and techniques can be used to adapt to various needs and circumstances.

In one embodiment, the mapping computing entity 110 may store digital maps. In another embodiment, the mapping computing may be in communication with or associated with one or more mapping websites/servers/providers/databases (including providers such as maps.google.com, bing.com/maps/, mapquest.com, Tele Atlas®, NAVTEQ®, and/or the like) that provide map data of digital maps to a variety of users and/or entities. Using the digital maps, an appropriate computing entity can provide map information/data, for example, about serviceable points (e.g., their locations, attributes, and/or the like) and/or their corresponding street networks based on map data. An appropriate computing entity can also provide map information/data, for example, about traveling to different serviceable points on the street networks. For instance, the map data may include a route for delivering one or more items to different serviceable points, the most efficient order for delivering items to the serviceable points, directions for traveling to and/or from the serviceable points, the estimated distance for traveling to and/or from the serviceable points, the expected time for traveling to and/or from the serviceable points, and/or the like. The term "route" is used generically to refer to any path traversed by a vehicle 100, person, animal, and/or the like. The map data may also include other information about serviceable points and/or traveling to and from serviceable points, such as current estimated speeds for associated street segments, historical speeds for associated street segments, nearest street segments, posted speed limits for associated street segments, interpolated locations of serviceable points, reverse geocoded locations of serviceable points, latitude and longitude points of serviceable points, distances between various serviceable points, directions, stop orders, and/or the like. Certain examples of these types of information are described in U.S. application Ser. No. 13/940,824, which is hereby incorporated in its entirety by reference.

In one embodiment, the mapping computing entity 110 can identify and/or retrieve map data associated with serviceable points and/or geographic areas (e.g., areas/points of interest). A geographic area may be one or more delivery routes, serviceable points, delivery locations, parking locations, sidewalks, highways, trails, geofenced areas, alleys, paths, walkways, streets, routes, street segments, entrance or exit ramps, roads, zip codes, area codes, cities, counties, states, provinces, countries, and/or other identifiable location.

In one embodiment, although not necessary, the map data can be provided to the driver of the vehicle 100 in a variety of ways and using various formats. For instance, the mobile device 105 (or other appropriate device) may provide turn-by-turn navigation to the driver of a vehicle 100 for traveling between each stop. As will be recognized, a variety of other approaches and techniques can be used to adapt to various needs and circumstances.

In one embodiment, the mapping computing entity 110 can identify and/or retrieve other map data associated with serviceable points and/or geographic areas. In one example, the mapping computing entity 110 can identify, retrieve, or determine the interpolated or reverse geocoded locations on the street networks for one or more of the serviceable points shown in Table 2, for instance. Or, in another example, the mapping computing entity 110 can identify, retrieve, and/or reverse geocode the latitude and longitude points of the serviceable points if available, such as the location of 1201 West Peachtree Street, Northwest being located at 33.7869128, −84.3875602. As will be recognized, a variety of other techniques and approaches can be used to adapt to various needs and circumstances.

The information/data about street networks, street segments, direction, altitudes, longitudes, latitudes, speed limits, direction restrictions, and/or the like can be collected in a variety of ways.

b. Telematics Data

In one embodiment, telematics data associated with serviceable points, geographic areas, points/areas of interest, street networks, street segments, and/or the like can be collected/captured (Block 500 of FIG. 5). To do so, appropriate computing entities (e.g., data collection devices 130, mobile devices 105, and/or other computing entities) can be configured to collect/capture and store telematics data as vehicles 100 travel, traverse, or similar words used herein interchangeably street networks (or other areas) and/or as drivers operate the vehicles 100 and/or mobile devices 105. In one embodiment, the telematics data may comprise location data, such as longitude data, latitude data, altitude data, heading or direction data, geocode data, course data, position data, time data, as well as other types of data (including those previously described).

1. Geofence Based: Defined Geographic Areas

In one embodiment, the process may be begin with a computing entity (e.g., via a user operating the computing entity) identifying or defining one or more geographic areas. In one embodiment, the geographic areas may correspond to countries, regions, states, counties, cities, towns, private land areas, vehicle staging areas, parking lots (e.g., at malls or other establishments), driveways, and/or the like. For example, geographic areas may be defined around the United States, the state of Georgia, Gwinnett County in the state of Georgia, zip codes, area codes, and/or the like. In one embodiment, the geographic areas may correspond to roads, streets, avenues, toll roads, ways, interstates, and/or the like. For example, each geographic area may be defined around a public road (e.g., substantially around I-285) or a portion of a public road (e.g., exit and/or entrance ramps on I-75 in Georgia or throughout the U.S.). In one embodiment, the geographic areas may correspond to delivery routes, bus routes, and/or taxis routes (e.g., driven by delivery drivers, bus drivers, and/or taxis drivers). The geographic areas may be defined based on zoning classifications associated with different geographic areas (e.g., an office park, industrial park, and/or neighborhood).

According to various embodiments of the present invention, a geographic area may overlap or reside wholly within another geographic area. Geographic areas may, for example, be as large as an entire country, region, state, county, city, or town (or larger). According to various embodiments, the geographic areas need not be continuous. In other words, a geographic area may specifically exclude an area that would otherwise fall within the geographic area (e.g., such that the geographic area forms a donut or other shape around the excluded area).

The geographic areas may be defined based on any number and/or combination of factors including, but not limited to, those described above. The foregoing examples are therefore provided for exemplary purposes only and should not be taken in any way as limiting embodiments of the present invention to the examples provided.

2. Geofence Based: Defined Geofences

In one embodiment, once the geographic areas have been defined or identified, a computing entity (e.g., via the user operating a computing entity) may define one or more geofences, such as defining a geofence around a geographic area. The geofences may be defined to surround a defined geographic area, such as surrounding countries, regions, states, counties, cities, towns, interstates, roads, streets, avenues, toll roads, zip codes, area codes, ways, exit and entrance ramps, delivery routes, bus routes, taxis routes, industrial parks, neighborhoods, off-road areas (e.g., areas without paved roads), private land areas, parking lots (e.g., at malls or other establishments), driveways, and/or the like. The geofences may be defined, for example, by the latitude and longitude coordinates associated with various points along the perimeter of the geographic area. Alternatively, geofences may be defined based on latitude and longitude coordinates of the center, as well as the radius, of the geographic area. Geofences may be as large as an entire country, region, state, county, city, or town (or larger). The geographic areas, and therefore the geofences, may be any shape including, but not limited to, a circle, square, rectangle, an irregular shape, and/or the like. Moreover, the geofenced areas need not be the same shape or size. Accordingly, any combination of shapes and sizes may be used in accordance with embodiments of the present invention. Similarly, a geofence may overlap or reside wholly within another geofence.

In one embodiment, once at least one geofence has been defined, the coordinates (or similar methods for defining the geofenced areas) may be stored in an information/database associated with, for example, the data collection device 130, mobile device 105, and/or mapping computing entity 110. Thus, as the vehicle 100 enters and exits the one or more defined geofences, a computing entity (the data collection device 130, mobile device 105, and/or mapping computing entity 110) can monitor the location of the vehicle 100 and trigger/initiate certain events based on the vehicle's 100 location.

3. Geofence Based: Collection of Telematics Information/Data

In one embodiment, after the one or more geofenced areas (e.g., geofences) have been defined, the location of the vehicle 100 can be monitored (Block 500 of FIG. 5). Generally, the location of the vehicle 100 can be monitored by any of a variety of computing entities, including the data collection device 130, the mobile device 105, the mapping computing entity 110, and/or the like. For example, as noted above, the vehicle's 100 location at a particular time may be determined with the aid of location-determining devices, location sensors 120 (e.g., GNSS sensors), and/or other telemetry location services (e.g., cellular assisted GPS or real time location system or server technology using received signal strength indicators from a Wi-Fi network). By using the vehicle's 100 location, a computing entity (data collection device 130, mobile device 105, mapping computing entity 110, and/or the like) can determine, for example, when the vehicle 100 enters a defined geofence.

In one embodiment, in response to (e.g., after) a determination that a vehicle 100 has entered a defined geofenced area, a computing entity (e.g., the data collection device 130, mobile device 105, or mapping computing entity 110) can collect/capture relevant telematics information/data. For example, the data collection device 130, mobile device 105, or any other appropriate computing entity can collect/capture telematics information/data (e.g., latitude, longitude, direction, altitude, geocode, course, position, time, and/or speed information/data) about the area being traversed while within the geofenced area. Similarly, the data collection device 130, mobile device 105, or any other appropriate computing entity can collect/capture telematics data about where a delivery, pickup, or vehicle visit is made within the geofenced area. As will be recognized, a variety of other information/data (e.g., telematics information/data) can also be collected/captured such as speed information/data, geofenced area information/data (e.g., the triggering geofence), emissions information/data, engine information/data, tire pressure information/data, oil pressure information/data, idle information/data, meteorological information/data, and/or the like. In one embodiment, the collected telematics information/data can be routinely, periodically, and/or continuously transmitted to, for example, the mapping computing entity 110.

In one embodiment, after the vehicle 100 has entered the geofenced area, the location of the vehicle 100 can continue to be monitored by any of a variety of computing entities. By using the vehicle's 100 location, a computing entity can determine, for example, when the vehicle 100 exits the defined geofenced area. As described, this may include using location-determining devices, location sensors 120 (e.g., GNSS sensors), or other telemetry location services (e.g., cellular assisted GPS or real time location system or server technology using received signal strength indicators from a Wi-Fi network).

In another embodiment, in response to (e.g., after) a determination that a vehicle 100 has exited the defined geofenced area, a computing entity can collect/capture relevant telematics information/data. For instance, the data collection device 130, mobile device 105, or any other appropriate computing entity can collect/capture telematics information/data (e.g., latitude, longitude, location, direction, altitude, geocode, course, position, time, and/or speed information/data) about the area being traversed outside the geofenced area. Similarly, the data collection device 130, mobile device 105, or any other appropriate computing entity can collect/capture telematics data about where a delivery, pickup, or vehicle visit is made outside the geofenced area. As described, a variety of other telematics information/data (e.g., telematics information/data) can also be collected/captured, such as speed information/data, emissions information/data, geofenced area information/data (e.g., the triggering geofence), RPM information/data, tire pressure information/data, oil pressure information/data, idle information/data, meteorological information/data, and/or the like. Moreover, the collected telematics information/data can be routinely, periodically, and/or continuously transmitted to, for example, the mapping computing entity 110.

As indicated, collected/captured telematics information/data can be stored/recorded in an electronic record. For example, in one embodiment, a computing entity (e.g., the data collection device 130, mobile device 105, or mapping computing entity 110) can create a record for each serviceable point, for each visit to a serviceable point, each variation of an address or name associated with a serviceable point, for a route, for a trip, for a time period, and/or the like. In these examples, the records can be updated on a routine, periodic, and/or continuous basis. As will be recognized, a variety of other approaches and techniques can be used to adapt to various needs and circumstances.

4. Non-Geofence Based: Collection of Telematics Information/Data

In one embodiment, the appropriate computing entities can collect/capture telematics data regularly, periodically, continuously, and/or upon determining the occurrence of one or more predefined triggers/events (Block 500 of FIG. 5). In another embodiment, the appropriate computing entities can collect/capture telematics data in response to certain triggers or events. For example, the data collection device 130 can monitor data generated by the vehicle sensors (120, 125) for parameters that match predefined triggers/events. In one embodiment, the data collection device 130 can monitor some or all the following predefined events: (a) the vehicle 100 being turned on and beginning to idle (e.g., where vehicle sensors 120, 125 indicate the vehicle's engine is turned on and the vehicle speed is zero); (b) the vehicle 100 beginning to move and thereby ceasing to idle (e.g., where the vehicle sensors 120, 125 indicate the vehicle's engine is on and the vehicle's speed has increased from zero to a non-zero value); (c) the vehicle 100 slowing to a stop and beginning to idle (e.g., where the vehicle sensors 120, 125 indicate the vehicle's engine is on and the vehicle's speed has decreased from a non-zero value to zero); (d) the vehicle 100 being turned off and ceasing to idle (e.g., where the vehicle sensors 120, 125 indicate the vehicle's engine is turned off and the vehicle speed is zero); (e) the vehicle 100 moving out of a geo-fenced area; (f) the vehicle 100 moving into a geo-fenced area; (g) the vehicle 100 moving into a geo-fenced area associated with a delivery area assigned to the vehicle 100 and/or its driver; (h) the vehicle 100 moving out of a geo-fenced area associated with a delivery area assigned to the vehicle 100 and/or its driver; (i) the vehicle 100 beginning to move in a reverse direction; (j) the vehicle 100 ceasing to move in a reverse direction; (k) the vehicle's 100 seat belt being engaged or disengaged while the vehicle's 100 engine is on; (l) the vehicle 100 beginning to move in a forward direction; (m) the vehicle 100 ceasing to move in a forward direction; (n) the vehicle 100 traveling above a certain speed; (o) the vehicle 100 being placed in the park position; and/or a variety of other triggers/events.

The data collection device 130, for example, can determine whether any of such (or other) predefined triggers/events have occurred as the vehicle 100 traverses, travels, visits, or operates on street networks (or other areas) and/or as the driver operates the vehicle 100 and/or mobile device 105. If a predefined trigger/event is detected, the data collection device 130 (or other devices) can capture and store telematics data from the vehicle sensors 120, 125. As noted earlier, the telematics data captured from the sensors 120, 125 may include various types of telematics data, including location data.

If a predefined trigger/event is not detected, the data collection device 130 (or other devices) can determine whether a threshold data capture time has elapsed. For example, in one embodiment, the threshold data capture time can be defined as 30 seconds (or any other time period). If the data collection device 130 determines that the threshold data capture time has not elapsed, the data collection device 130 can continue monitoring for predefined events. However, if the data collection device 130 determines that the threshold data capture time has elapsed (e.g., more than 30 seconds have passed since the last time that data was captured from the vehicle sensors), the data collection device 130 can capture telematics data.

In one embodiment, the telematics data may include contextual data collected/captured with the telematics data. In another embodiment, contextual data can be associated with the collected/captured telematics data. For instance, an appropriate computing entity (e.g., mobile device 105) can be configured to collect/capture some or all of the following contextual data: (a) the date (e.g., 12/30/2014) and time (e.g., 13:24) the telematics data is captured; (b) the driver associated with the mobile device 105 at the time the telematics data is captured (e.g., James P. Smith); (c) the vehicle associated with the driver at the time the telematics data is captured (e.g., a vehicle identification number such as AS445); (d) the type of telematics data captured (e.g., stop status, lunch break); (e) if applicable—a route number and/or stop number associated with the input telematics data (e.g., stop 3); (f) the serviceable point associated with the telematics data captured; (g) the address associated with the telematics data captured; (h) a logged reason for and location of the data capture (e.g., a code indicating the detected predefined trigger/event or indicating that the threshold data capture time interval elapsed); and/or the like. Further, in one embodiment, an appropriate computing entity (e.g., the data collection device 130, the mapping computing entity 110, the mobile device 105, and/or the like) can be configured to associate the captured telematics data with the contextual data by, for example, storing fields of telematics data captured from the vehicle sensors 120, 125 in the same record, or records, as concurrently captured contextual data, thereby associating the two types of data if necessary.

In one embodiment, the data collection device 130 (or other devices) can transmit the captured telematics data and/or associated contextual data to the mapping computing entity 110 or mobile device 105. This may be accomplished by using any of the transmission methods and systems described herein, as well as other methods, protocols, and systems known in the art. In one embodiment, the data collection device 130 can be configured to first attempt to transmit captured data to the mapping computing entity 110, and subsequently attempt to transfer data to the mobile device 105 if a connection with the mapping computing entity 110 is unavailable.

According to various embodiments, the mobile device 105 can also be configured to capture telematics data. More specifically, the mobile device 105 can collect/capture telematics data regularly, periodically, continuously, and/or upon determining the occurrence of one or more predefined triggers/events. For instance, the mobile device 105 can monitor its user interface or other inputs for user input (e.g., from a driver). In one embodiment, the mobile device 105 can be configured to receive and recognize user input indicating some or all of the following: (a) that a delivery stop has commenced; (b) that a delivery stop has ended; (c) that a particular delivery stop is a pickup, delivery, or both; (d) that a particular bill of lading and its associated freight or packages have been picked up or delivered; (e) the number of units picked up or delivered at a stop; (f) the weight of packages or freight picked up or delivered at a stop; (g) that a lunch or break period has commenced; (h) that a lunch or break period has ended; (i) that a particular delay has been encountered; (j) that a particular delay has ended; (k) that a driver has begun a work day and is on the clock; (l) that a driver has ended a work day and is off the clock; (m) that the vehicle 100 has moved out of a geo-fenced area (e.g., as indicated by a GPS sensor); (n) that the vehicle 100 has moved into a geo-fenced area; (o) that the vehicle 100 has moved into a geo-fenced area associated with a delivery area assigned to the vehicle 100 and/or its driver; (p) that the vehicle 100 has moved out of a geo-fenced area associated with a delivery area assigned to the vehicle 100 and/or its driver; (q) that a scan event of an item (e.g., scanning a barcode) has occurred; (r) that an electronic signature capture event has occurred; (s) that the vehicle 100 or driver is at a particular serviceable point; (t) that an item has been picked up from or delivered to a serviceable point; (u) that the vehicle 100 (or driver walking with the mobile device 105) has entered or exited a street network; (v) that the vehicle 100 has been placed in the park position; (w) that a configurable period of time has elapsed; (x) that a vehicle visit to a serviceable point has occurred; (y) as a result of a location-based search; and/or the like.

The mobile device 105 (or other devices) can determine whether any of such (or other) predefined triggers/events have occurred. If a predefined trigger/event is detected, the mobile device 105 (or other devices) can collect/capture and store telematics data. As noted earlier, the telematics data may include various types of telematics data, including location data. If a predefined trigger/event is not detected, the mobile device 105 can determine whether a threshold data capture time has elapsed. For example, in one embodiment, the threshold data capture time can be defined as 30 seconds (or any other predefined time period). If the mobile device 105 determines that the threshold data capture time has not elapsed, the mobile device 105 can continue monitoring for predefined events. However, if the mobile device 105 determines that the threshold data capture time has elapsed (e.g., more than 30 seconds have passed since the last time that data was captured from the vehicle sensors), the mobile device 105 can collect/capture telematics data.

In one embodiment, the telematics data may include contextual data. In another embodiment, the mobile device 105 can collect/capture contextual data and associate the contextual data with the collected/captured telematics data. For instance, the mobile device 105 can be configured to capture some or all of the following contextual data: (a) the date (e.g., 12/30/2014) and time (e.g., 13:24) the telematics data is captured; (b) the driver associated with the mobile device 105 at the time the telematics data is captured (e.g., James P. Smith); (c) the vehicle associated with the driver at the time the telematics data is captured (e.g., a vehicle identification number such as AS445); (d) the type of telematics data captured (e.g., delay code, stop status); (e) if applicable—a route number and/or stop number associated with the input telematics data (e.g., route 1, stop 3); (f) the serviceable point associated with the telematics data; (g) the address associated with the telematics data; and/or the like. Further, the mobile device 105 (or other appropriate computing entity) can be configured to associate the collected/captured telematics data with the collected/captured contextual data in order to ensure that concurrently captured telematics data and contextual data are linked. For example, in one embodiment, the mobile device 105 can be configured to store one or more fields of telematics data in the same record, or records, as concurrently captured contextual data, thereby associating the two types of data if necessary.

In one embodiment, the mobile device 105 can transmit the captured telematics data and/or associated contextual data to the mapping computing entity 110. This may be accomplished by using any of the transmission methods and systems described herein, as well as other methods, protocols, and systems known in the art. In one embodiment, the mobile device 105 can be configured to first attempt to transmit captured data to the mapping computing entity 110, and subsequently attempt to transfer data to the data collection device 130 if a connection with the mapping computing entity 110 is unavailable.

c. Assignment of Geocodes to Addresses

As will be recognized, the mapping computing entity 110 can assign location information/data (e.g., geocode information/data, longitude and latitude information/data, and/or the like) from the telematics data collected for a serviceable point and store/record the assigned location information/data in a record for the serviceable point. For example, assume a package is picked up from or delivered to 1201 West Peachtree Street, Northwest, Atlanta, Ga. 30309—although embodiments of the present invention are not limited to the pick-up or delivery context. Further assume that the location information/data collected during the pick up or delivery indicates that this serviceable point is located at 33.7869128, −84.3875602 (using the DD coordinate system). This location information/data can be collected as described in detail above. Although this example is in the DD coordinate system, a variety of other formats can be used as well, such as the DMS, UTM, UPS coordinate systems, and/or the like. The mapping computing entity 110 can assign this location information/data to the serviceable point (1201 West Peachtree Street, Northwest, Atlanta, Ga. 30309) and store/record the location information/data in a record for 1201 West Peachtree Street, Northwest, Atlanta, Ga. 30309. FIG. 6 provides an example of such a record. Additionally or alternatively, the mapping computing entity 110 may process the location information/data prior to assigning or recording/storing the same. Such processing may include smoothing, averaging, weighting, and/or the like the location information/data itself or in coordination with other collected location information/data for the serviceable point. This may allow for very precise location determinations for serviceable points and overcome the challenges of using estimating techniques such as interpolation. This location information/data can be updated periodically, regularly, continuously, in response to certain triggers, after subsequent visits and collections at the serviceable point, and/or the like to correct inaccuracies in the collections. Exemplary concepts further describing these features are provided in U.S. Pat. No. 8,065,076 and U.S.

Publ. Appl. No. 2011-0112761, which are hereby incorporated herein in their entireties by reference.

d. Standardization

As previously described, each serviceable point can be assigned location information/data (and/or other types of telematics data). In the previous example, the serviceable point (e.g., 1201 West Peachtree Street, Northwest, Atlanta, Ga. 30309) is the address of a pickup or delivery location visited by carrier personnel. As will be recognized, there may be multiple variations of the address associated with a serviceable point (and any other serviceable point). For example, 1201 West Peachtree Street, Northwest, Atlanta, Ga. 30309 may be represented using a variety of addresses in different formats, including:

(1) 1201 West Peachtree Street, Northwest, Atlanta, Ga. 30309;

(2) 1201 W Peachtree Street, Atlanta, Ga. 30309;

(3) 1201 West Peachtree St., Atlanta, Ga. 30309;

(4) 1201 W. Peachtree St., Atlanta, Ga. 30309;

(5) 1201 West Peachtree Street, Atlanta, Ga. 30309;

(6) 1201 W Peachtree Street, NW, Atlanta, Ga. 30309; and (7) 1201 W Peachtree St, NW, Atlanta, Ga. 30309.

This may be due to different acceptable abbreviations, standards, and practices. Each of these different address formats may be stored as a unique record corresponding to the serviceable point because they are not exactly the same. Moreover, each of these different address formats for 1201 West Peachtree Street, Northwest, Atlanta, Ga. 30309 may be associated with location information/data (potentially unique location information/data). The location information/data for each address format may vary depending on where the location information/data was collected for the visit to the serviceable point. For example, for a pickup or delivery, the location information/data can be collected near the mailbox, in the road in front of the serviceable point, at the front door, in a parking area near the serviceable point, and/or the like. Based on the different possible locations of the sample, the location information/data may also vary.

Even further, there may be various recipient names, entity names, location descriptions, and/or the like associated with a given serviceable point. For example, the names associated with the different address format variations for 1201 West Peachtree Street, Northwest, Atlanta, Ga. 30309 may include: (1) A. Richard Jones; (2) Richard Jones; (3) Rich Jones; (4) Kyle Jones; (5) Beverly Jones; and (6) Janice Jones. Thus, the mapping computing entity 110 may store/record or otherwise have access to location information/data for each address format and/or address format and name combination for which a record exists in one more databases to which the mapping computing entity 110 has access. Exemplary location information/data for the name and address combinations for 1201 West Peachtree Street are provided below and in FIG. 7.

(1) 33.7869128, −84.3875602 // A. Richard Jones // 1201 West Peachtree Street, Northwest;

(2) 33.7869124, −84.3875610 // Richard Jones // 1201 W Peachtree Street;

(3) 33.7869121, −84.3875605 // Rich Jones // 1201 West Peachtree St.;

(4) 33.7869123, −84.3875611 // Kyle Jones // 1201 W. Peachtree St.;

(5) 33.7869125, −84.3875613 // Rich Jones // 1201 West Peachtree Street;

(6) 33.7869128, −84.3875601 // Rich Jones // 1201 W Peachtree Street, NW;

(7) 33.7869131, −84.3875603 // Beverly Jones // 1201 W Peachtree St, NW;

(8) 33.7869130, −84.3875609 // Janice Jones // 1201 West Peachtree St.; and (9) 33.7869126, −84.3875607 // Janice Jones // 1201 W. Peachtree St.

As shown in FIG. 7, each unique combination of a name and address format (or address format, entity name, location description, combinations thereof, and/or the like) can be assigned location information/data (e.g., geocode information/data, longitude and latitude information/data, and/or the like) and stored/recorded in a record (Block 505 of FIG. 5). Continuing with the above example shown in FIG. 7, because of the different address format and name combinations, there are nine different records for this serviceable point (e.g., address)—nine different name and address combinations. With multiple records for a single serviceable point (e.g., address), a serviceable point database may be populated with an excessive number of records that are not necessarily tied together or associated with one another in an organized manner. Further, each record may have different location information/data associated with the serviceable point. For instance, the location associated with (1) 33.7869128, −84.3875602 // A. Richard Jones // 1201 West Peachtree Street, Northwest, may correspond to the front door at the serviceable point. The location associated with (2) 33.7869124, −84.3875610 // Richard Jones //1201 W Peachtree Street may correspond to mailbox at the serviceable point. And the location associated with (3) 33.7869121, −84.3875605 // Rich Jones // 1201 West Peachtree St. may correspond to the beginning or end of a long driveway at the serviceable point. As will be recognized, a variety of other approaches and techniques can be used to adapt to various needs and circumstances.

In one embodiment, because of all the different combinations and potentially different location information/data, it can lead to many records for a single serviceable point and cause inefficient searching for addresses or names associated with serviceable points and uncertainty as to which location information/data is accurate for the serviceable point. For example, a search for the serviceable point for the address in the above example may return nine different results. Thus, address standardization for the serviceable points may provide clarity to the information/data, allow for the removal of extraneous records, and provide for reduced search times. In one embodiment, the address standardization may be used to reduce the number of records.

In one embodiment, multiple approaches can be used to standardize the addresses associated with serviceable points. For a given record, for example, a configurable distance (e.g., a tolerance, zone of confidence, geofence, and/or similar words used herein interchangeably) can be used to identify other potentially relevant address formats associated with a serviceable point. For instance, to create/determine a zone of confidence, the mapping computing entity 110 can use the location information/data that is stored/recorded in a record for a serviceable point to define a tolerance (e.g., a configurable distance) from the stored/recorded location information/data. The tolerance (e.g., a configurable distance) may be an acceptable distance or range from the stored/recorded location information/data for a serviceable point that will likely correspond to the serviceable point. For example, a zone of confidence may be plus or minus (±) a specific distance or range using the corresponding coordinate system (e.g., DD, DMS, UTM, and/or UPS). Similarly, a configurable distance may be in a variety of other formats, such as degrees, minutes, seconds, feet, meters, miles, kilometers, and/or the like.

Continuing with the above example, the mapping computing entity 110 may use a zone of confidence (e.g., a configurable distance) of ±0.000001, ±0.000001 for addresses in the DD coordinate system. However, as described above, the zone of confidence (e.g., the configurable distance) may vary both in terms of format, range, distance, and/or the like to adapt to various needs and circumstances. In the above example, the mapping computing entity 110 can identify all records within the zone of confidence (e.g., ±0.000001, ±0.000001) of the location information/data for 1201 West Peachtree Street, Northwest, Atlanta, Ga. 30309 (Block 505 of FIG. 5). The search can be based (a) on address information (e.g., street address 1201 and zip code 30309), (b) on location information/data, (c) on location information/data and address information, (d) on location information/data and a zip code, (e) on location information/data and names, (f) combinations thereof, and/or the like. In one embodiment, the mapping computing entity 110 can identify all of the nine different variations of 1201 West Peachtree Street, Northwest (described above) based on the zone of confidence (e.g., configurable distance) since each of these addresses is within the zone of confidence (e.g., ±0.000001, ±0.000001) of the location information/data (e.g., 33.7869128, −84.3875602) for 1201 West Peachtree Street, Northwest. That is, the mapping computing entity 110 can identify the records within the zone of confidence (e.g., ±0.000001, ±0.000001) of the location information/data (e.g., 33.7869128, −84.3875602). As will be recognized, a variety of other approaches and techniques can be used to identify the appropriate addresses (e.g., records for the addresses) to adapt to various needs and circumstances.

In another embodiment, for a given record or address, similar addresses (e.g., individual records for the addresses) can be identified from the different address formats (Block 505 of FIG. 5). For example, the mapping computing entity 110 can use the street number, street name, and zip code to identify similar addresses. In this example, the mapping computing entity 110 can use 1201, Peachtree, and 30309 as search criteria. Based on this search criteria, as shown in FIG. 7, the mapping computing entity 110 can identify the nine records associated with the search criteria: (1) 33.7869128, −84.3875602 // A. Richard Jones // 1201 West Peachtree Street, Northwest; (2) 33.7869124, −84.3875610 // Richard Jones // 1201 W Peachtree Street; (3) 33.7869121, −84.3875605 // Rich Jones // 1201 West Peachtree St.; (4) 33.7869123, −84.3875611 // Kyle Jones // 1201 W. Peachtree St.; (5) 33.7869125, −84.3875613 // Rich Jones // 1201 West Peachtree Street; (6) 33.7869128, −84.3875601 // Rich Jones // 1201 W Peachtree Street, NW; (7) 33.7869131, −84.3875603 // Beverly Jones // 1201 W Peachtree St, NW; (8) 33.7869130, −84.3875609 // Janice Jones // 1201 West Peachtree St.; and (9) 33.7869126, −84.3875607 //Janice Jones // 1201 W. Peachtree St. As will be recognized, a variety of other approaches and techniques can be used to identify the appropriate addresses (e.g., records for the addresses) to adapt to various needs and circumstances.

Regardless of the techniques and approaches used to identify the relevant records corresponding to a serviceable point, the mapping computing entity 110 can standardize, normalize, and similar words used herein interchangeably the addresses or location information/data in the corresponding records for the serviceable point. In one embodiment, the mapping computing entity 110 can standardize the records for the corresponding serviceable point by, for example, determining/calculating reference location information/data for the serviceable point (Block 510 of FIG. 5). The reference location information/data may be: (1) the mean latitude and longitude of all the identified records (including or excluding outliers); (2) the median latitude and longitude of all the identified records (including or excluding outliers); (3) the average latitude and longitude of all the identified records (including or excluding outliers); (4) the mode latitude and longitude of all the identified records (including or excluding outliers); (5) the location information/data associated with the best-formatted text address; and/or the like. Further, the mapping computing entity 110 can further weight, smooth, and/or otherwise modify the location information/data to determine/calculate reference location information/data for the serviceable point. In one embodiment, the mapping computing entity 110 can standardize the longitude and latitude of the identified records for 1201 West Peachtree Street, Northwest, Atlanta, Ga. 30309 by determining the average of the different latitude and longitude points—33.7869126, −84.3875606. In another embodiment, 33.7869128, −84.3875602 may be the location/geocoded information/data associated with the best-formatted text address for the serviceable point (e.g., West Peachtree Street, Northwest). As will be recognized, a variety of other approaches and techniques can be used to adapt to various needs and circumstances.

In such embodiments, the mapping computing entity 110 can assign or associate the reference location information/data to the identified records to serve as a location-based key (e.g., a foreign key for the references) for the records corresponding to the serviceable point (Block 515 of FIG. 5). This approach associates the records with one another and creates a standardized address. As shown in FIGS. 8A and 8B, the record for 1201 West Peachtree Street, Northwest, Atlanta, Ga. 30309 is now associated with the other eight records for the same serviceable point based on the reference location information/data. And in some embodiments, the mapping computing entity 110 can use the location information/data to create parent-child relationships among or between the records. In this example, to limit the number of records initially searched, searches can be restricted to parent records initially with access to child records as necessary.

In various embodiments, this allows for addresses to be searched based on and expressed as numerical or digital values (e.g., the reference location information/data and at least a portion of the physical/street address)—Block 520 of FIG. 5. For example, in one embodiment, the serviceable point associated with 1201 West Peachtree Street, Northwest, Atlanta, Ga. 30309 may be searched for and expressed as 1201, 33.7869126, −84.3875606, 30309—using the average longitude and latitude of the records identified as being within the zone of confidence. In another embodiment, the serviceable point associated with 1201 West Peachtree Street, Northwest, Atlanta, Ga. 30309 may be searched for and expressed as 1201, 33.7869126, −84.3875606, 30309—using the location information/data for the best-formatted text address for the serviceable point. In another embodiment, the serviceable point associated with 1201 West Peachtree Street, Northwest, Atlanta, Ga. 30309 may be searched for and expressed as 1201, Peachtree, 30309. As will be recognized, the serviceable point associated with 1201 West Peachtree Street, Northwest, Atlanta, Ga. 30309 may be expressed as and searched for in other ways as well, including (a) 1201, 33.7869126, −84.3875606, (b) 1201, 33.7869126, −84.3875606, (c) Atlanta, 33.7869126, −84.3875606, (d) 33.7869126, −84.3875606, 30309, (e) Peachtree, 33.7869126, −84.3875606, and/or the like. In one embodiment, the address can also be expressed to include specific building, apartment, suite, office, floor, department, and/or workstation information/data. This may be useful for campuses, apartment buildings, office buildings, malls, and/or the like. Thus, for instance when an item is received for delivery, an appropriate search can be performed for the delivery location to identify the reference location/data for this information.

In one embodiment, the mapping computing entity 110 can use the reference location information/data to remove records for the address that are outside the zone of confidence, which records likely include errors in the collection samples or where the collections occurred. Moreover, this approach allows for third party information/data to be indexed easily and allows the mapping computing entity 110 to validate address information/data based on the reference location information/data. As will be recognized, a variety of other approaches and techniques can be used to adapt to various needs and circumstances.

e. Geographic Representations and/or Identification of Geographic Areas/Points of Interest As described, the mapping computing entity 110 can store or have access to one or more geographical maps comprising map information/data. Additionally, the mapping computing entity 110 can store or have access to collected telematics data corresponding to one or more geographic areas, points of interest, and/or similar words used herein interchangeably.

As indicated in Block 525 of FIG. 5, the mapping computing entity 110 can receive a request to determine or cause display of geographic representations of telematics data for a geographic area (e.g., area/point of interest) designated via input from a user computing entity 135 by, for example, the user drawing a polygon around the geographic area using an input mechanism, defining a geofence, selecting displayed routes, and/or the like. Moreover, the mapping computing entity 110 can receive a request to determine or cause display of geographic representations of the telematics data for a geographic area (e.g., area/point of interest) by receiving input identifying a zip code, geocode, latitude and longitude point, route, delivery route, area code, city, county, state, province, country, hemisphere, and/or the like. As will be recognized, a variety of approaches and techniques can be used to adapt to various needs and circumstances.

Responsive to such requests, the mapping computing entity 110 can identify telematics data (e.g., location information/data) corresponding to the geographic area (e.g., area/point of interest)—Block 530 of FIG. 5. The telematics data may correspond to serviceable points associated with the geographic area (e.g., area/point of interest) for which telematics data has been collected, to routes or portions of routes for which telematics data has been collected, and/or the like. For instance, the mapping computing entity 110 can identify all serviceable points, routes, or portions of routes within Atlanta, Ga., within the zip code 30309, within the Eastern Seaboard of the United States, within the United States, within the area code 404, within a defined geofence, within a drawn polygon, within a zone of confidence (e.g., configurable distance) from a geocode or longitude and latitude point, and/or the like. That is, the mapping computing entity 110 can identify all records with collected telematics data (e.g., location information/data) within the specified geographic area (e.g., area/point of interest) based on information contained in the corresponding records, such as latitude and longitude information, address information, and/or the like. For example, assuming the specified geographic area (e.g., area/point of interest) were zip code 30309, the mapping computing entity 110 can identify all records with address information indicating that they are within with the 30309 zip code. In this example, the mapping computing entity 110 can identify all the records shown in FIGS. 6, 7, 8A, and/or 8B. The mapping computing entity 110 can also identify other records corresponding to zip code 30309. In other examples, the mapping computing entity 110 can identify all records associated with Atlanta, Ga., the Eastern Seaboard of the United States, the United States, area code 404, a defined geofence, a drawn polygon, a zone of confidence (e.g., configurable distance) from a geocode or longitude and latitude point, and/or the like. As will be recognized, a variety of other approaches and techniques can be used to adapt to various needs and circumstances.

In one embodiment, after identifying the records corresponding to the geographic area (e.g., area/point of interest), the mapping computing entity 110 can use the corresponding location information/data to identify, determine, generate, create, and similar words used herein interchangeably geographic representations of the location information/data for the geographic area (Block 535 of FIG. 5). For example, the mapping computing entity 110 can use the identified location information/data (e.g., telematics data) for specified geographic area (e.g., area/point of interest) to identify the precise locations of serviceable points, delivery locations, pickup locations, streets, roads, avenues, bridges, highways, interstates, and/or. Further, the mapping computing entity 110 can use the corresponding location information/data for the geographic area (area/point of interest) to determine the topography or geography of the specified geographic area.

Continuing with the above example, with the geographic area (e.g., area/point of interest) being zip code 30309, the mapping computing entity 110 can plot, cause display of, draw, position, and/or similar words used herein interchangeably the corresponding identified location information/data (e.g., telematics data) for the geographic area on a digital map. For instance, to do so, the mapping computing entity 110 may indicate a colored dot, pixel, or other graphic representing the positions for each point of location information/data in the geographic area. For instance, FIG. 9 shows an embodiment in which the mapping computing entity 110 has created and caused display of the aggregated positions (the darkened portions) of location information/data that has been collected in the United States. As can be seen from this figure, the location information/data represents a rough outline of the physical geography (e.g., geographic boundary) of portions of the United States. In one embodiment, the plotted, displayed, drawn, or positioned geographic representation can be saved and stored in a variety of formats—e.g., as part of a feature layer, raster layer, service layer, geoprocessing layer, basemap layer, and/or the like (Block 540 of FIG. 5).

Figure 10:
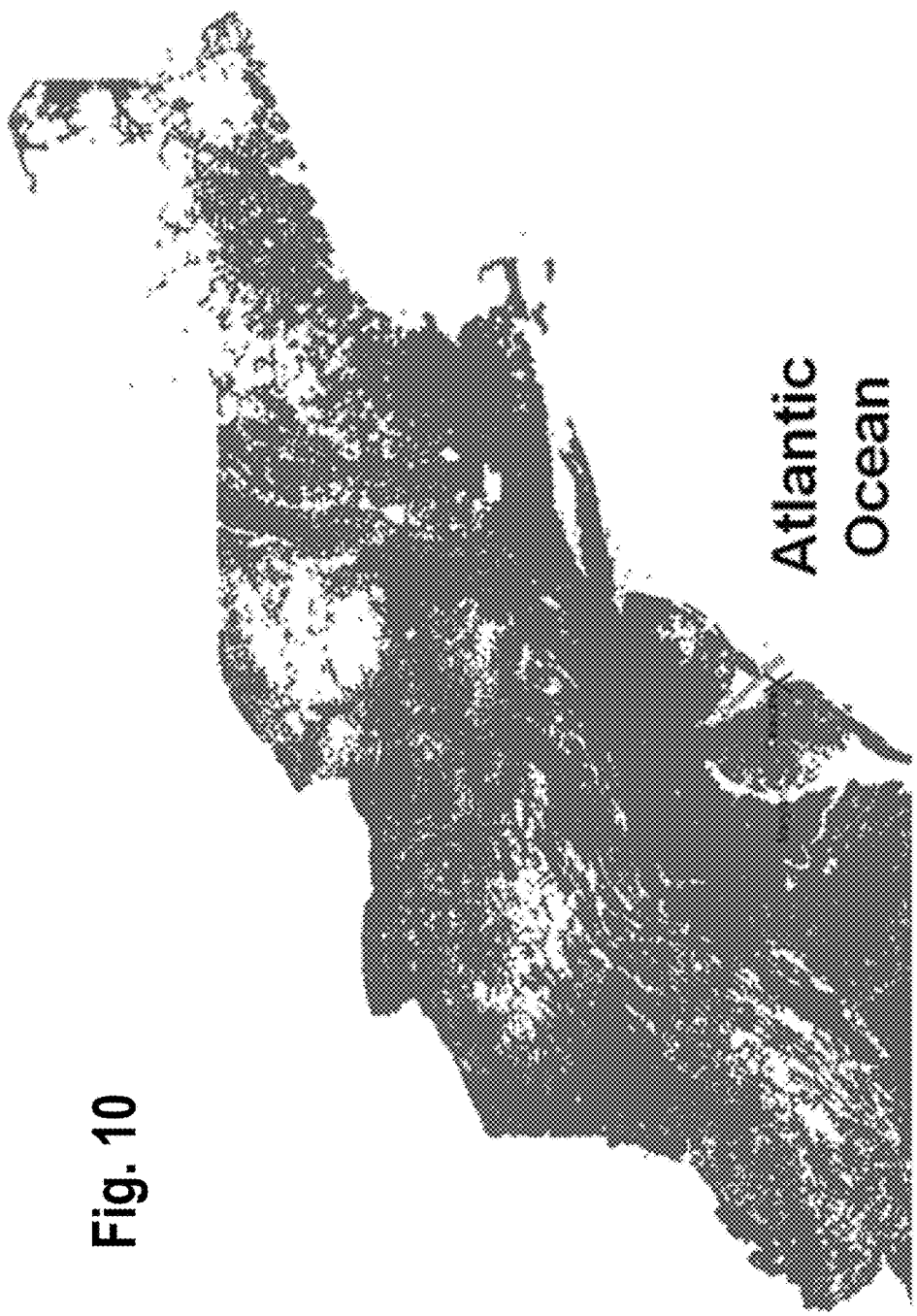
Figure 11:
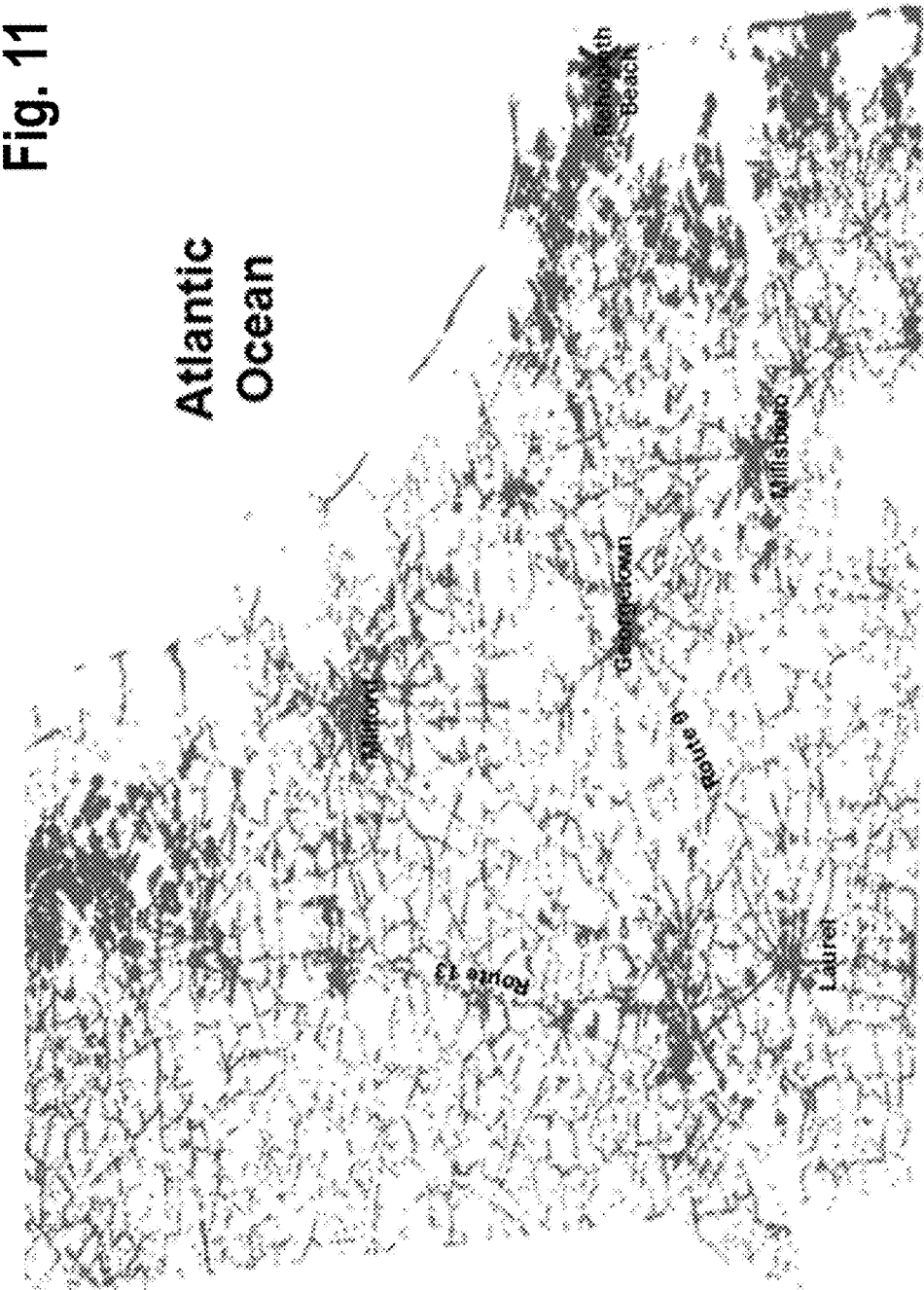
Figure 12:

With the location information/data identified, the mapping computing entity 110 can cause display of various levels (e.g., zoomed or enhanced view) of the location information/data. For example, FIG. 10 shows an embodiment in which the mapping computing entity 110 causes display of the aggregated positions (the darkened portions) of location information/data that has been collected in the Eastern seaboard (e.g., a zoomed in view of FIG. 9). FIGS. 11 and 12 show zoomed-in or enhanced views of geographic areas (e.g., areas/points of interest) of FIG. 9 or 10.

As shown in FIG. 12, by using the collected location information/data for geographic areas (e.g., points/areas of interest), street networks or portions thereof can be identified/determined and displayed based at least in part on the collected location information/data. However, as will also be understood from FIG. 12, some of the location information/ data being displayed for the relevant serviceable points on the digital map do not track all of the corresponding street networks shown in FIG. 12. Thus, the same can be used to update the digital map, e.g., adding portions of street networks that do not exist in the digital map and/or correcting the location of portions of street networks that exist in the digital map. Exemplary concepts further describing these features are provided in U.S. Publ. Appl. No. 2012-0253861, which is hereby incorporated herein in its entirety by reference. The geographic representations can then be stored a digital maps themselves and/or as layers or parts of other digital maps.

Figure 13:
Figure 14:
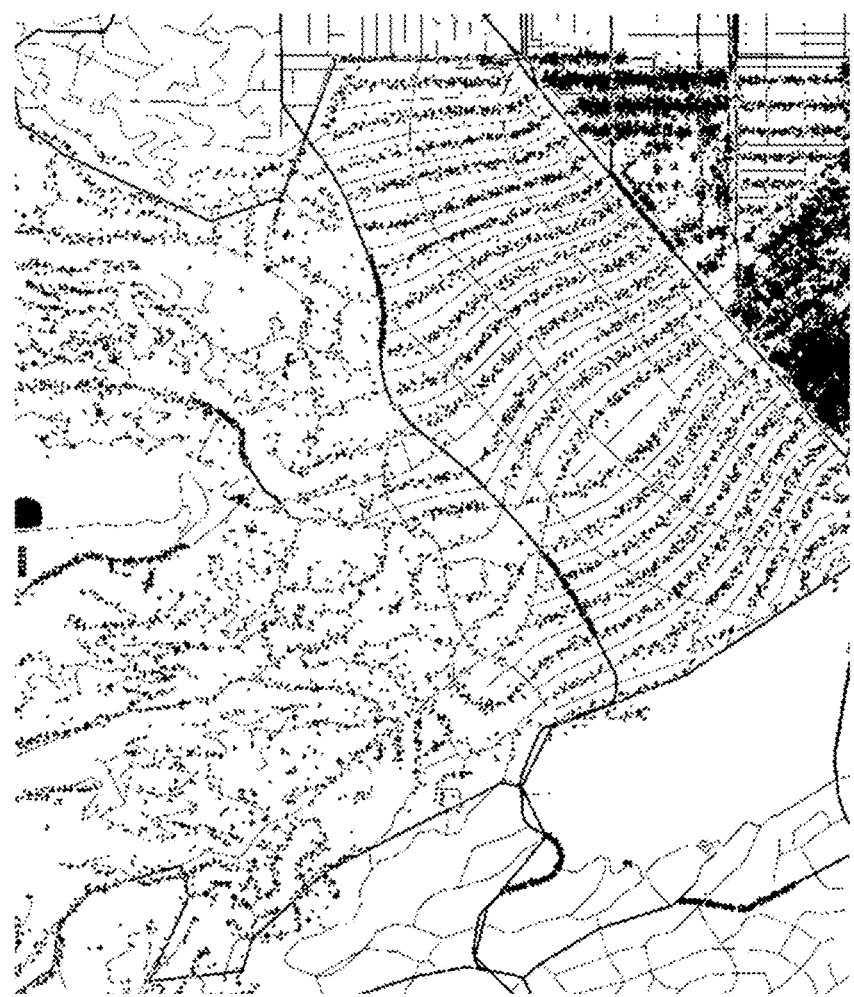

In another example, FIG. 13 shows a satellite image of a geographic area and raster layer view superimposed or overlaid thereon. FIG. 14 shows a representation of collected location information/data for the same geographic area. As can be seen from these two figures, the figures provide geographic representations of street networks determined/identified for a geographic area by the mapping computing entity 110 from the location information/data as described previously. As will be recognized, a variety of other approaches and techniques can be used to adapt to various needs and circumstances.

In another embodiment, the mapping computing entity 110 can receive input to identify/determine the precise location of the origins and terminations of streets, roads, avenues, bridges, highways, interstates, and/or the like of a street network. In embodiment, this may include where name changes in the streets, roads, avenues, bridges, highways, interstates, and/or the like occur based on crossing, for example, defined governmental boundaries (e.g., cities, towns, counties, and states). For example, to identify/determine the precise termination and origin of West Peachtree Street Northwest in Atlanta, Ga., the mapping computing entity 110 can identify all of the serviceable points for West Peachtree Street Northwest in Atlanta, Ga., for which a record with location information/data exists in one more databases to which the mapping computing entity 110 has access. With such information/data identified, the mapping computing entity 110 can cause display of the corresponding aggregated location information/data for the relevant geographic areas (e.g., areas/points of interest) on a digital map. In essence, the mapping computing entity 110 creates a collection of location information/data strung together with addresses for West Peachtree Street Northwest in Atlanta, Ga., as a boundary for the street.

As will be recognized, the mapping computing entity 110 can receive input to identify/determine other geographic areas (e.g., areas/points of interest) as well, including states, provinces, counties, cities, landmarks, natural or governmental boundaries, geographic areas, zip codes, area codes, geofenced areas, delivery areas, and/or the like. As in the previous examples, depending on the outcome desired, this may include just the reference location information/data for a single geographic area (e.g., area/point of interest) or all location information/data associated with the geographic area. With the appropriate information/data identified, the mapping computing entity 110 can cause display of the corresponding aggregated location information/data for the relevant geographic area (e.g., area/point of interest) on a digital map.

As indicated, in addition to identifying the location information/data for geographic areas (e.g., areas/points of interest), the mapping computing entity 110 can store/record this information as part of a digital map. For instance, the mapping computing entity 110 can appropriately store/record such map information/data separately from or as a part of a digital map, e.g., as part of a feature layer, raster layer, service layer, geoprocessing layer, basemap layer, and/or the like. This may include identifying/determining the outer boundaries of areas/points of interest, such as countries, states, provinces, counties, cities, geographic areas, geofenced area, landmarks, zip codes, area codes, delivery areas, streets, roads, avenues, bridges, highways, interstates, and/or the like.

As previously noted, it may be advantageous for a carrier such as UPS to collect and store/record such telematics data (e.g., location information/data). This is because such a company may have tens of thousands of pickup and delivery personnel traversing millions of miles a day with the ability to capture billions of location information/data samples a year. Moreover, such information/data can be collected from a uniform technology platform, which can eliminate uncertainty and variability with the collected information/data.

f. Search for Areas/Points of Interest

Figure 15C:
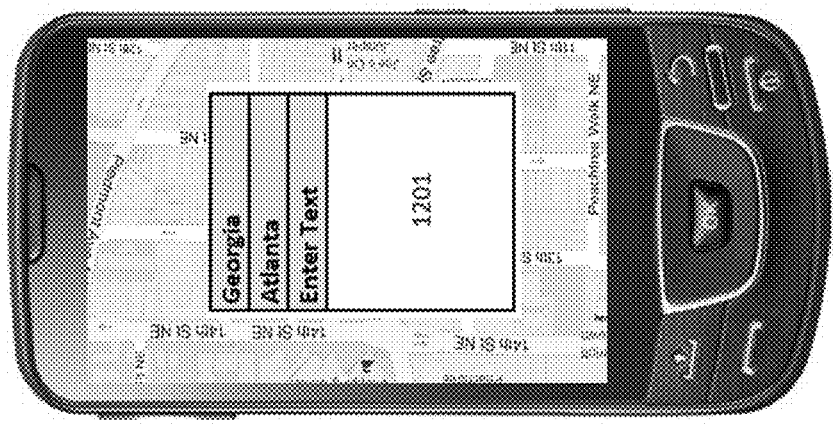
Figure 15B:
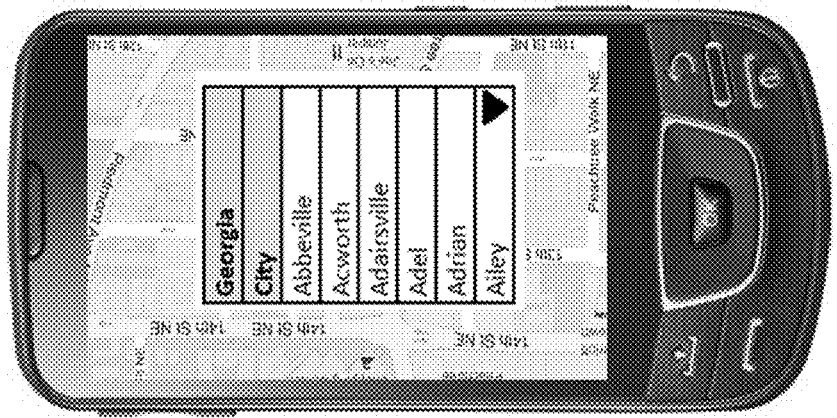
Figure 15A:
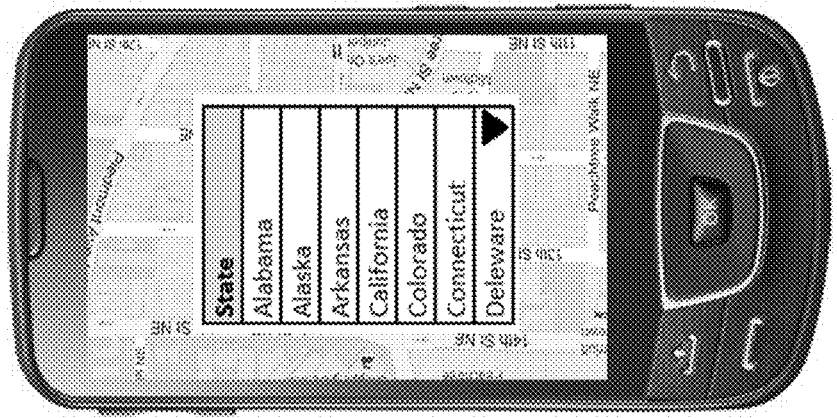
Figure 16:
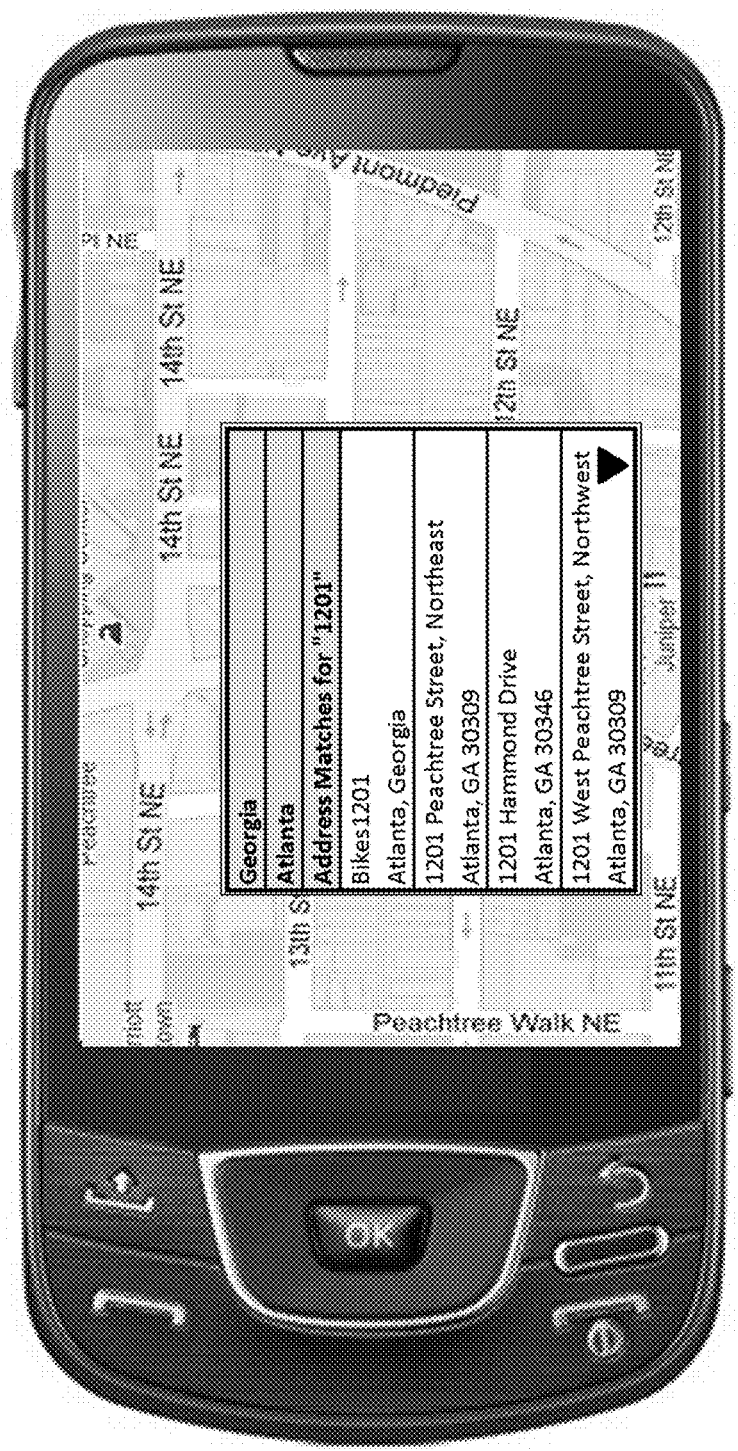

In one embodiment, the mapping computing entity 110 can use hierarchical or stepped queries, for example, to identify/determine areas/points of interest. For instance, as shown in FIGS. 15A, 15B, and 15C, a user can operate a mobile device 105 to search for areas/points of interest. In one embodiment, this may include using hierarchical or stepped searches starting from broad categories, levels, choices and moving to narrow categories, levels, choices. For instance, in one embodiment, an application executing on a mobile device 105 can function such that a user can identify a geographic area (e.g., area/point of interest)—Block 545 of FIG. 5. If the desired country were the United States, the application executing on the mobile device 105 can function such that the user can input the state and city for the area/point of interest. Then, at some point, the application executing on the mobile device 105 can function such that the user can input text (e.g., a street name, a street type, a numerical portion of an address, an intersection, an entity name, a landmark name, and/or the like) associated with the area/point of interest (Block 550 of FIG. 5). The mobile device 105 can then transmit this information to the mapping computing entity 110 as search criteria. The mapping computing entity 110 can query one or more databases to which it has access based on the search criteria. The mapping computing entity 110 can then provide any appropriate responses to the mobile device 105 for display to the user.

By way of example, FIGS. 15A, 15B, and 15C provide an example in which the user inputs Georgia as the state, followed by Atlanta as the city, and followed by 1201 as a description for the area/point of interest. Thus, "1201" may be a street name, a street type, a numerical portion of an address, an entity name, a landmark name, and/or the like associated with the area/point of interest. After receiving this input, the mobile device 105 can transmit the same to the mapping computing entity 110 (or various other computing entities) to use as search criteria.

In response to receiving such search criteria, in this example, the mapping computing entity 110 can perform a search (identify the records) corresponding to all serviceable points in Atlanta, Ga. and that include 1201 as part of the description (Block 555 of FIG. 5). Thus, the returned serviceable points may include "1201" as part of the address, as part of a person's or entity's name, the location information/data for the serviceable point, and/or the like. After identifying the relevant records, the mapping computing entity 110 can provide the same to the mobile device 105 for display to the user (shown in FIG. 16)—Block 560 of FIG. 5. The user can view, scroll, and/or access this information to select the appropriate area/point of interest (including requesting directions, navigation, and/or more information about the area/point of interest). In this example, after identifying the relevant geographic area (Atlanta, Ga.), at least four search results are provided with as being associated with or containing "1201." The entity named Bikes1201 and three separate addresses containing 1201 (shown in FIG. 16).

Figure 17:

In another embodiment, the mapping computing entity 110 can use the standardized digital addresses, for example, to identify/determine areas/points of interest. For instance, as shown in FIG. 17, a user can operate a mobile device 105 to search for areas/points of interest. In one embodiment, this may include entering identifying information about an area/point of interest, such as a street number, street name, street type, closest landmark, closest business entity, distance from current location, distance from another known location or landmark (e.g., serviceable point for which location information/data exists), and/or the like. For instance, in one embodiment, an application executing on a mobile device 105 can function such that a user can input information about the area/point of interest. Then, the application executing on the mobile device 105 can function such that the user can input information about an estimated distance (including zones of confidence, configurable distances, and/or the like) that the area/point of interest is within in relation to a known location (e.g., the mobile device's 105 current location or serviceable point for which location information/data exists). The mobile device 105 can then transmit this information to the mapping computing entity 110 as search criteria. The mapping computing entity 110 can query one or more database to which it has access based on the search criteria. The mapping computing entity 110 can then provide the results to the mobile device 105 for display to the user.

Figure 18:
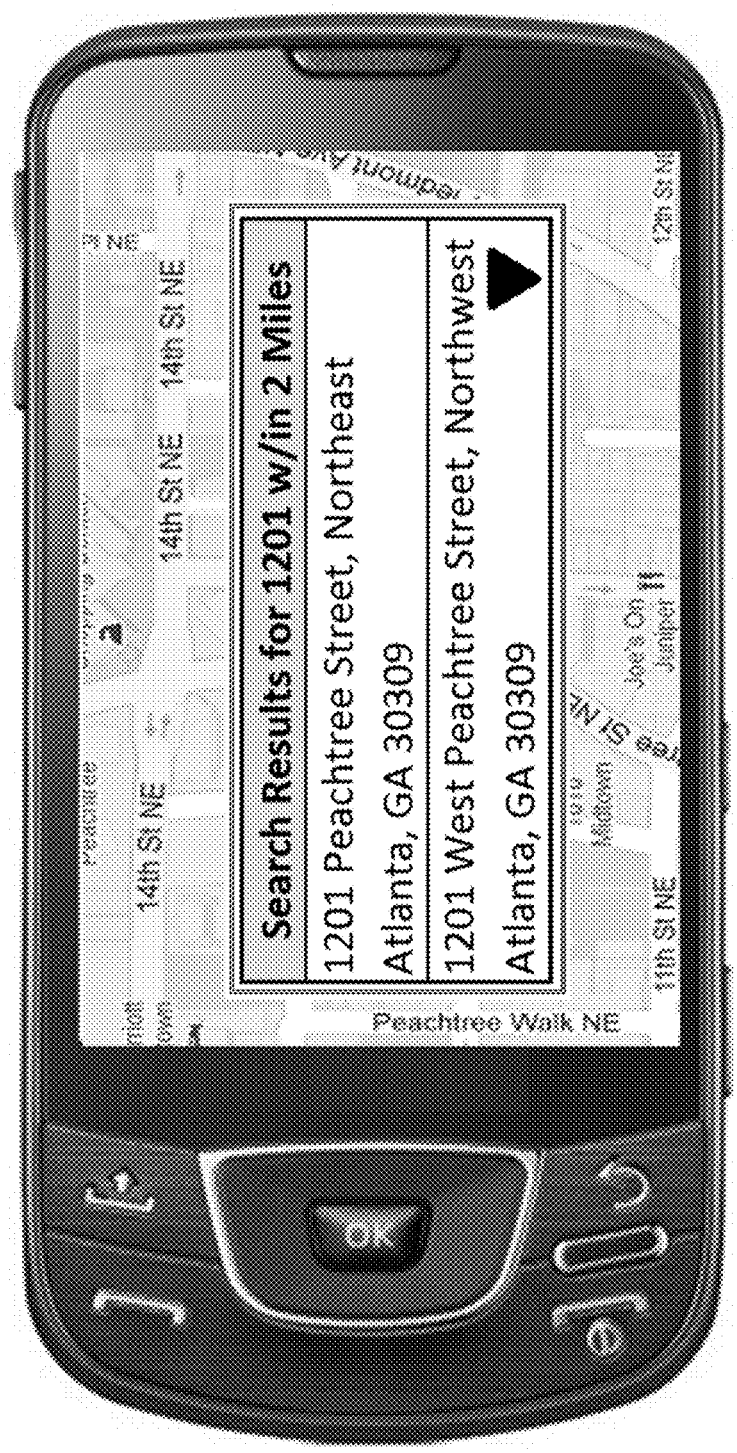

By way of example, FIGS. 17 and 18 provide an example of a user located at the Four Seasons Hotel in Atlanta, Ga. (75 Fourteenth Street, Northwest, Atlanta, Ga. 30309) as the current location of the mobile device 105. As shown FIG. 17, the user inputs the search criteria as 1201 and being within 2 miles of the mobile device's 105 current location. After receiving this input, the mobile device 105 can transmit the same to the mapping computing entity 110 to use as search criteria. The mobile device 105 can also transmit the current location information/data for the mobile device 105 at the Four Seasons Hotel (33.7862580, −84.3852790)—as described previously.

In response to receiving such search criteria, in this example, the mapping computing entity 110 can identify the records corresponding to all serviceable points within two miles of the 33.7862580, −84.3852790 (Four Seasons Hotel) and that include "1201" as part of the street number. As part of the search, the mapping computing entity 110 can identify serviceable points with either reference location information/data or collected location information/data being within approximately a two-mile area (e.g., radius) of 33.7862580, −84.3852790 (Four Seasons Hotel) and having 1201 as part of the street number. After identifying the relevant records, the mapping computing entity 110 can provide the same to the mobile device 105 to display to the user (shown in FIG. 18). The user can view, scroll, and/or access this information to select the appropriate area/point of interest (including requesting directions, navigation, and/or more information about the area/point of interest).

As will be recognized, a variety of other approaches and techniques can be used to adapt to various needs and circumstances. Moreover, by having standardized, digital addresses, the mapping computing entity 110 can easily search for serviceable points in relation to locations for which known location information/data exists.

Figure 19:
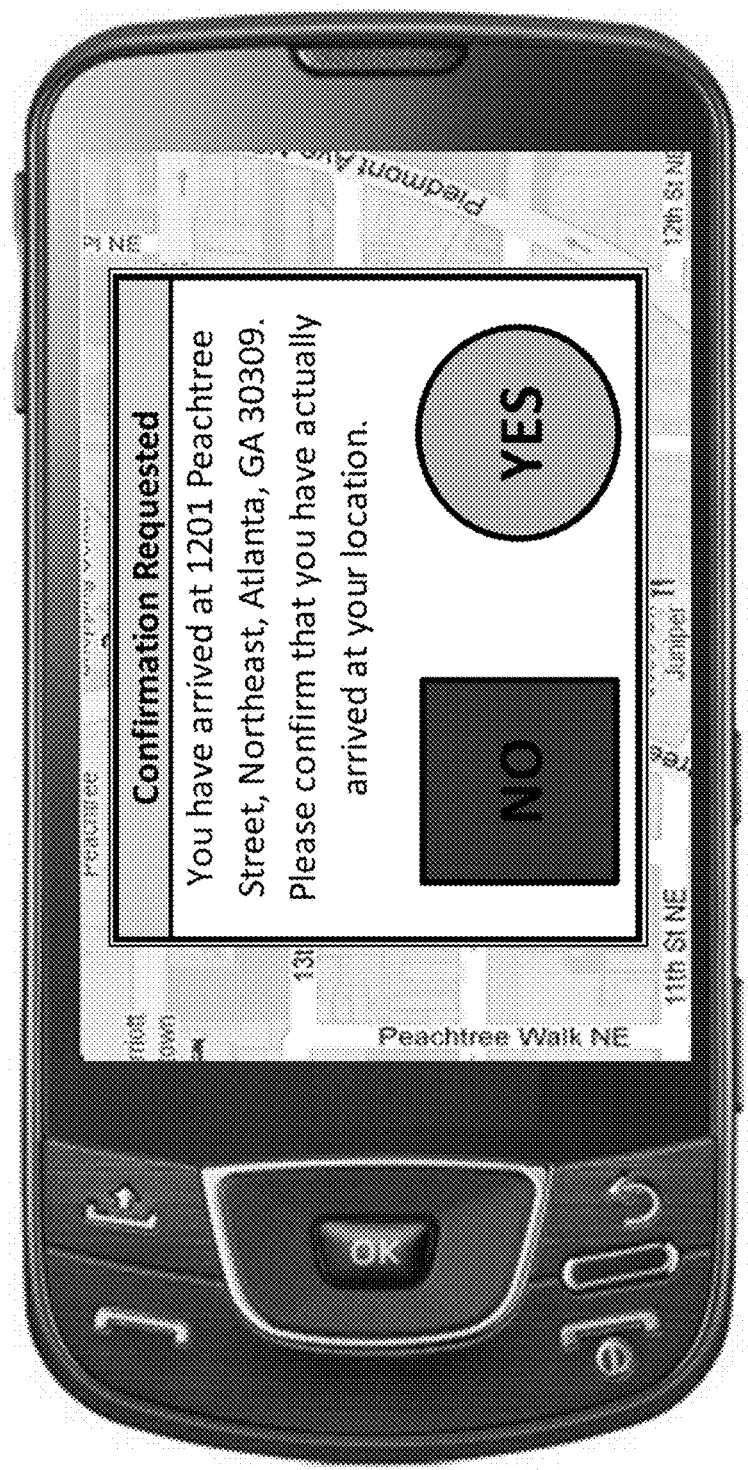

In one embodiment, if a user (e.g., operating mobile device 105) requests directions and/or navigation information to the area/point of interest, the mobile device can monitor the location of mobile device 105 (Block 565 of FIG. 5). When the mobile device is at or within a zone of confidence (e.g., configurable distance) from the reference location information/data corresponding to the area/point of interest, the mobile device 105 can request confirmation that the user arrived at the correct location. This can be used to confirm that the reference location information/data for the area/point of interest is accurate (Block 570 of FIG. 5). For instance, FIG. 19 shows an exemplary screen displayed via the mobile device that requests the user to confirm that he or she actually arrived at 1201 Peachtree Street, Northeast, Atlanta, Ga. 30309. In response, the user (e.g., operating mobile device 105) can select the appropriate response for transmission by the mobile device 105 to the mapping computing entity 110. The mapping computing entity 110 can store these types of responses in association with the corresponding areas/points of interest. In certain embodiments, once the number of negative responses meets or exceeds a configurable threshold, the mapping computing entity 110 can request that the location information/data for the area/point of interest be updated. Correspondingly, the previously described processes can be repeated to update the location information/data for the area/point of interest. As will be recognized, a variety of other approaches and techniques can be used to adapt to various needs and circumstances.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computerized method for performing a location-based search, the computerized method comprising:
receiving, by a mobile device associated with a user, an indication of a geographic area from the user;
receiving, by the mobile device, input from the user, identifying (a) a distance parameter and (b) a search criteria for the geographic area for a point of interest having a reference location information;
providing, by the mobile device, (a) the distance parameter and (b) the search criteria for a search to be performed based on the geographic area and the search criteria to a network device, wherein the network device is in communication with one or more vehicles that send and receive data, wherein data sent from the one or more vehicles is processed by a mapping computing entity of the network device to provide to the mobile device, results for the (a) distance parameter and (b) the search criteria for the geographic area for the point of interest having the reference location information;

receiving from the mapping computing entity and displaying, by the mobile device, results for the (a) distance parameter and (b) the search criteria comprising information about the point of interest, wherein the results are provided based on the data sent from the one or more vehicles;

responsive to receiving the results for the (a) distance parameter and (b) the search criteria, monitoring, by the mobile device, the location of the mobile device to determine when the mobile device is within a zone of confidence associated with the point of interest within the distance parameter;

responsive to determining that the mobile device is within the zone of confidence, determining that the mobile device is proximate to the point of interest, and dynamically generating an interface, presented to a display of the mobile device, the interface comprising visible indicia indicating a request for confirmation from the user of the mobile device that the user has arrived at the point of interest and that the reference location information for the point of interest is accurate;

receiving a response from the user, by the mobile device, via the interface; and transmitting, by the mobile device, the response from the user to the network device.

2. The method of claim 1 further comprising, responsive to receiving the response to the request for confirmation originating from the mobile device, storing the response in association with a record for the point of interest.

3. The method of claim 1 further comprising storing location data in association with a record for the point of interest.

4. The method of claim 1, wherein:
the zone of confidence comprises a predetermined threshold within the location of the point of interest.

5. The method of claim 1, further comprising:
receiving a request to update location information associated with a location of the point of interest in response to detecting a number of negative responses to the request for confirmation exceeding a predefined threshold.

6. The method of claim 1, further comprising:
detecting an indication of a selection, via the interface, of a response pertaining to confirmation regarding whether the mobile device is actually at the correct location of the point of interest.

7. The method of claim 1, further comprising:
providing, via the mobile device to the network device, one or more responses indicating that the user of the mobile device is at an incorrect location of the point of interest to enable the network device to determine whether a number of the responses exceeds a predetermined threshold denoting that the stored location of the point of interest is to be updated.

8. A mobile device comprising at least one processor and at least one memory including program code, the at least one memory and the program code configured to, with the processor, cause the mobile device to perform a location-based search by at least:

receive input identifying (a) a distance parameter and (b) search criteria for a point of interest having reference location information in a geographic area;

provide (a) the distance parameter and (b) the search criteria for a search to be performed based on the geographic area and the search criteria to a network device, wherein the network device is in communication with one or more vehicles that send and receive data, wherein data sent from the one or more vehicles is processed by a mapping computing entity of the network device to provide to the mobile device, results for the (a) distance parameter and (b) the search criteria for the geographic area for the point of interest having the reference location information;

receive from the mapping computing entity and display results for the (a) distance parameter and (b) the search criteria comprising information about the point of interest, wherein the results are provided based on the data sent from the one or more vehicles;

responsive to receiving the results for the (a) distance parameter and (b) the search criteria, monitor the location of the mobile device to determine when the mobile device is within a zone of confidence associated with the point of interest within the distance parameter;

responsive to determining that the mobile device is within the zone of confidence, determine that the mobile device is proximate to the point of interest, and dynamically generate an interface, presented to a display of the mobile device, the interface comprising visible indicia indicating a request for confirmation from a user of the mobile device that the user has arrived at the point of interest and that the reference location information for the point of interest is accurate; and receive a response from the user via the interface.

9. The mobile device of claim 8, wherein responsive to receiving a response to the request for confirmation, transmit the response from the user to the network device.

10. The mobile device of claim 8, wherein the memory and program code are further configured to, with the processor, cause the mobile device to store location data in association with a record for the point of interest.

11. The mobile device of claim 8, wherein:
the zone of confidence comprises a predetermined threshold within the location of the point of interest.

12. The mobile device of claim 8, wherein the memory and program code are further configured to, with the processor, cause the memory device to:
receive a request to update location information associated with a location of the point of interest in response to detecting a number of negative responses to the request for confirmation exceeding a predefined threshold.

13. The mobile device of claim 8, wherein the memory and program code are further configured to, with the processor, cause the memory device to:
detect an indication of a selection, via the interface, of a response pertaining to confirmation regarding whether the mobile device is actually at the correct location of the point of interest.

14. The mobile device of claim 8, wherein the memory and program code are further configured to, with the processor, cause the mobile device to:
provide, to the network device, one or more responses indicating that the user of the mobile device is at an incorrect location of the point of interest to enable the network device to determine whether a number of the responses exceeds a predetermined threshold denoting that the stored location of the point of interest is to be updated.

15. A computer program product for performing a location-based search, the computer program product comprising at least one non-transitory computer-readable storage medium having computer-readable program code portions stored therein for execution by a mobile device, the computer-readable program code portions comprising:

an executable portion configured to, after identifying a geographic area, receive input identifying (a) a distance parameter and (b) search criteria for the geographic area for a point of interest having reference location information;

an executable portion configured to provide (a) the distance parameter and (b) the search criteria for a search to be performed based on the geographic area and the search criteria to a network device, wherein the network device is in communication with one or more vehicles that send and receive data, wherein data sent from the one or more vehicles is processed by a mapping computing entity of the network device to provide to the mobile device, results for the (a) distance parameter and (b) the search criteria for the geographic area for the point of interest having the reference location information;

an executable portion configured to receive and cause display of results of the search comprising information about the point of interest based at least in part on (a) the distance parameter and (b) the search criteria comprising information about the point of interest, wherein the results are provided based on the data sent from the one or more vehicles;

an executable portion configured to, responsive to providing the results of the search to the mobile device, monitor the location of the mobile device to determine when the mobile device is within a zone of confidence associated with the point of interest within the distance parameter;

an executable portion configured to, responsive to determining that the mobile device is within the zone of confidence proximate the point of interest, and dynamically generate an interface, presented to a display of the mobile device, the interface comprising visible indicia indicating a request for confirmation from a user of the mobile device that the mobile device that the user has arrived at the point of interest and that the reference location information for the point of interest is accurate.

16. The computer program product of claim 15 further comprising an executable portion configured to, responsive to receiving a response to the request for confirmation originating from the mobile device, transmit the response from the user to the network device.

17. The computer program product of claim 15, wherein the memory and program code are further configured to, with the processor, cause the apparatus to store location data in association with a record for the point of interest.

18. The computer program product of claim 15, wherein:
the zone of confidence comprises a predetermined threshold within the location of the point of interest.

19. The computer program product of claim 15, further comprising:
an executable portion configured to cause receipt of a request to update location information associated with a location of the point of interest in response to detecting a number of negative responses to the request for confirmation exceeding a predefined threshold.

20. The computer program product of claim 15, further comprising:
an executable portion configured to detect an indication of a selection, via the interface, of a response pertaining to confirmation regarding whether the mobile device is actually at the correct location of the point of interest.

21. The computer program product of claim 15, further comprising:
program code instructions configured to provide, via the mobile device to the network device, one or more responses indicating that the user of the mobile device is at an incorrect location of the point of interest to enable the network device to determine whether a number of the responses exceeds a predetermined threshold denoting that the stored location of the point of interest is to be updated.

\* \* \* \* \*